(12) United States Patent
Slate

(10) Patent No.: US 7,113,981 B2
(45) Date of Patent: Sep. 26, 2006

(54) CELLULAR TELEPHONE DOWNLOAD LOCKER

(75) Inventor: Michael L. Slate, Indianapolis, IN (US)

(73) Assignee: Mixxer, Inc., Seattle, WA (US)

( * ) Notice: Subject to any disclaimer, the term of this patent is extended or adjusted under 35 U.S.C. 154(b) by 244 days.

(21) Appl. No.: 10/747,588

(22) Filed: Dec. 29, 2003

(65) Prior Publication Data

US 2005/0144251 A1    Jun. 30, 2005

(51) Int. Cl.
*G06F 15/16* (2006.01)

(52) U.S. Cl. .................. 709/217; 709/206; 709/219; 455/414; 455/418; 455/419; 455/420

(58) Field of Classification Search ............... 709/217, 709/219, 206; 705/26; 455/414, 412.1, 455/418, 419, 420; 463/41; 725/112
See application file for complete search history.

(56) References Cited

U.S. PATENT DOCUMENTS

| | | | |
|---|---|---|---|
| 4,866,766 A | 9/1989 | Mitzlaff | |
| 4,868,561 A | 9/1989 | Davis | |
| 5,414,444 A | 5/1995 | Britz | |
| 5,452,354 A | 9/1995 | Kyronlahti et al. | |
| 5,461,666 A | 10/1995 | McMahan et al. | |
| 5,479,510 A | 12/1995 | Olsen et al. | |
| 5,481,599 A | 1/1996 | MacAllister et al. | |
| 5,483,581 A | 1/1996 | Hird et al. | |
| 5,485,370 A | 1/1996 | Moss et al. | |
| 5,486,686 A | 1/1996 | Zdybel, Jr. et al. | |
| 5,487,671 A | 1/1996 | Shpiro et al. | |
| 5,490,210 A | 2/1996 | Sasso | |
| 5,490,251 A | 2/1996 | Clark et al. | |
| 5,499,288 A | 3/1996 | Hunt et al. | |
| 5,510,777 A | 4/1996 | Pilc et al. | |
| 5,513,272 A | 4/1996 | Bogosian, Jr. | |
| 5,517,605 A | 5/1996 | Wolf | |
| 5,526,620 A | 6/1996 | Hallsten | |
| 5,530,852 A | 6/1996 | Meske, Jr. et al. | |
| 5,533,115 A | 7/1996 | Hollenbach et al. | |
| 5,534,855 A | 7/1996 | Shockley et al. | |
| 5,537,586 A | 7/1996 | Amram et al. | |
| 5,542,046 A | 7/1996 | Carlson et al. | |
| 5,544,255 A | 8/1996 | Smithies et al. | |
| 5,544,322 A | 8/1996 | Cheng et al. | |
| 5,548,726 A | 8/1996 | Pettus | |
| 5,550,976 A | 8/1996 | Henderson et al. | |

(Continued)

FOREIGN PATENT DOCUMENTS

WO    WO 99/43136    8/1999

(Continued)

OTHER PUBLICATIONS

*WAP 2.0 Technical White Paper*, Wireless Application Protocol Forum Ltd., Jan. 2002.

*Primary Examiner*—Zarni Maung
*Assistant Examiner*—V. Korobov
(74) *Attorney, Agent, or Firm*—Lee & Hayes, PLLC

(57) ABSTRACT

A system and method for providing data files, such as ringtones, screensavers, games, and other types of application software, to a mobile telephone, such as a cellular telephone, is disclosed. An illustrative system is internet-based and provides subscribers with access via a general purpose computer to a large number of data files that are selectable by subscribers for storing in respective user-specific data lockers that are established by the system. Users may access their user-specific data lockers via a URL link that is sent to their mobile phones by the system as a text message.

67 Claims, 17 Drawing Sheets

U.S. PATENT DOCUMENTS

| | | |
|---|---|---|
| 5,551,021 A | 8/1996 | Harada et al. |
| 5,572,571 A | 11/1996 | Shirai |
| 5,583,763 A | 12/1996 | Atcheson et al. |
| 5,598,461 A | 1/1997 | Greenberg |
| 5,606,597 A | 2/1997 | Newland |
| 5,608,786 A | 3/1997 | Gordon |
| 5,612,682 A | 3/1997 | DeLuca et al. |
| 5,613,012 A | 3/1997 | Hoffman et al. |
| 5,623,531 A | 4/1997 | Nilssen |
| 5,661,802 A | 8/1997 | Nilssen |
| 5,687,227 A | 11/1997 | Cohrs et al. |
| 5,689,825 A | 11/1997 | Averbuch et al. |
| 5,724,411 A | 3/1998 | Eisdorfer et al. |
| 5,727,047 A | 3/1998 | Bentley et al. |
| 5,732,216 A | 3/1998 | Logan et al. |
| 5,796,728 A | 8/1998 | Rondeau et al. |
| 5,799,063 A | 8/1998 | Krane |
| 5,828,956 A | 10/1998 | Shirai |
| 5,835,495 A | 11/1998 | Ferriere |
| 5,842,124 A | 11/1998 | Kenagy et al. |
| 5,870,683 A | 2/1999 | Wells et al. |
| 5,884,262 A | 3/1999 | Wise et al. |
| 5,915,001 A | 6/1999 | Uppaluru |
| 5,926,756 A | 7/1999 | Piosenka et al. |
| 5,930,703 A | 7/1999 | Cairns |
| 5,933,328 A | 8/1999 | Wallace et al. |
| 5,940,752 A | 8/1999 | Henrick |
| 5,940,775 A | 8/1999 | Kim |
| 5,948,059 A | 9/1999 | Woo et al. |
| 5,952,918 A | 9/1999 | Ohayon |
| 5,987,323 A | 11/1999 | Huotari |
| 5,999,094 A | 12/1999 | Nilssen |
| 5,999,599 A | 12/1999 | Shaffer et al. |
| 6,002,761 A | 12/1999 | Sremac |
| 6,018,654 A | 1/2000 | Valentine et al. |
| 6,018,656 A | 1/2000 | Shirai |
| 6,023,620 A | 2/2000 | Hansson |
| 6,035,018 A | 3/2000 | Kaufman |
| 6,035,189 A | 3/2000 | Ali-Vehmas et al. |
| 6,058,161 A | 5/2000 | Anderson et al. |
| 6,073,003 A | 6/2000 | Nilssen |
| 6,088,730 A | 7/2000 | Kato et al. |
| 6,091,947 A | 7/2000 | Sumner |
| 6,094,587 A | 7/2000 | Armanto et al. |
| 6,101,242 A | 8/2000 | McAllister et al. |
| 6,122,526 A | 9/2000 | Parulski et al. |
| 6,137,525 A | 10/2000 | Lee et al. |
| 6,138,006 A | 10/2000 | Foti |
| 6,144,722 A | 11/2000 | Anderson et al. |
| 6,167,130 A | 12/2000 | Rosen |
| 6,167,278 A | 12/2000 | Nilssen |
| 6,179,682 B1 | 1/2001 | Plain et al. |
| 6,219,413 B1 | 4/2001 | Burg |
| 6,222,838 B1 | 4/2001 | Sparks et al. |
| 6,226,379 B1 | 5/2001 | Swan et al. |
| 6,226,532 B1 | 5/2001 | Kim et al. |
| 6,229,990 B1 | 5/2001 | Toshida |
| 6,240,391 B1 | 5/2001 | Ball et al. |
| 6,243,375 B1 | 6/2001 | Speicher |
| 6,256,378 B1 | 7/2001 | Iggulden et al. |
| 6,292,668 B1 | 9/2001 | Alanara et al. |
| 6,351,776 B1 * | 2/2002 | O'Brien et al. ............. 709/245 |
| 6,366,791 B1 | 4/2002 | Lin et al. |
| 6,418,330 B1 | 7/2002 | Lee |
| 6,430,601 B1 * | 8/2002 | Eldridge et al. ............ 709/206 |
| 6,487,189 B1 * | 11/2002 | Eldridge et al. ............ 370/338 |
| 6,496,692 B1 | 12/2002 | Shanahan |
| 6,501,967 B1 | 12/2002 | Makela et al. |
| 6,515,988 B1 * | 2/2003 | Eldridge et al. ............ 370/389 |
| 6,546,002 B1 * | 4/2003 | Kim ........................ 370/351 |
| 6,560,640 B1 * | 5/2003 | Smethers .................... 709/219 |
| 6,775,670 B1 * | 8/2004 | Bessette ...................... 707/10 |
| 2002/0016748 A1 * | 2/2002 | Emodi et al. .................. 705/26 |
| 2002/0123336 A1 | 9/2002 | Kamada |
| 2002/0123359 A1 | 9/2002 | Wei et al. |
| 2002/0154759 A1 | 10/2002 | Ishii |
| 2003/0022662 A1 | 1/2003 | Mittal |
| 2003/0027604 A1 | 2/2003 | Hayashi |
| 2003/0092434 A1 | 5/2003 | Irisawa |
| 2003/0096605 A1 | 5/2003 | Schlieben et al. |
| 2003/0109251 A1 | 6/2003 | Fujito et al. |
| 2003/0142653 A1 | 7/2003 | Jiang et al. |
| 2003/0181193 A1 | 9/2003 | Wilhelmsson et al. |
| 2003/0187742 A1 | 10/2003 | Yamagishi |
| 2003/0199268 A1 | 10/2003 | Abe |
| 2004/0031058 A1 * | 2/2004 | Reisman .................... 725/112 |

FOREIGN PATENT DOCUMENTS

| | | |
|---|---|---|
| WO | WO 00/38340 | 6/2000 |

* cited by examiner

CELLULAR TELEPHONE DOWNLOAD LOCKER

BACKGROUND OF THE INVENTION

The present disclosure relates to a system and method for providing data files, such as ringtones, screensavers, games, and other types of application software, to mobile telephones, such as a cellular telephones. More particularly, the present disclosure relates to an internet-based system and method for providing subscribers with access to a large variety of data files that are selectable by subscribers for downloading to their mobile phones.

Mobile telephones, such as cellular telephones, have become increasingly popular and are used by a large portion of the population. Modern mobile telephones are now able to connect, wirelessly, to the internet. Mobile phones usually have a set of ringtones, games, and other functions that are preprogrammed into the phone by the manufacturers of the phones. Typical mobile telephones also have usable memory in which a user may store additional data files, such as ringtones, screensavers, games, and other application software which originate elsewhere. Thus, if the user desires ringtones, screensavers, games, etc. that have not been preprogrammed into the phone, the user may download into the usable memory of the phone, the desired ringtones, screensavers, games, etc. See, for example, the systems shown and described in U.S. Pat. Nos. 6,496,692 B1; 6,366,791 B1; and 6,018,654 and in U.S. Patent Application Publication No. 2002/0123336 A1.

SUMMARY OF THE INVENTION

A system and/or method according to this disclosure has one or more of the following features, which alone or in any combination, may comprise patentable subject matter. The system may comprise a database having a main library of user-selectable data files. The database may be accessible via a website connected to the internet. The system may comprise a set of lockers, each locker being allocated to an associated user of the system. Data files from the main library may be selectable by each user for placement, such as by copying, into their locker. Each of the lockers may comprise memory that is allocated by the system. The system may assign a URL to each locker. The system may send a text message to the mobile phone of the user in response to the user selecting a data file for placement in the user's locker. The text message may include a URL link so that, when a user selects the URL link via an appropriate user interface of their mobile phone, the user is connected via the internet to their locker. The system may store data regarding the type of mobile phone that is associated with each user and/or the type of mobile phone carrier (i.e., service provider) that is associated with each user. The system may format each data file selected by the user based on the type of mobile phone and/or the type of carrier that the user has. The database of the system may have stored therein multiple data files having the same basic or core information but formatted differently for different types of mobile phones and/or for different types of carriers. The data files selectable by the user may include audio files, image files, game software, and other types of application software. The audio files may be usable as ringtones. The image files may be usable as screensavers. The system may establish personal files for each user. The system may permit users to upload data files from their general purpose computers to their personal files. The personal files may be established separately from the lockers. The system may copy to a user's locker a data file uploaded by a user to their personal file. The system may send a text message to the mobile phone of a user in response to the user uploading a data file from their general purpose computer to their personal file. The system may allow users to alter the content of their lockers using their mobile phones. The system may allow users to delete data files from their lockers using their mobile phones. The system may evaluate the data files in the lockers of the users and automatically delete data files that have errors or that are not compatible with the type of mobile phone associated with a particular user.

In an illustrative embodiment, a main library of data files are divided into categories including screensavers, ringtones, utilities, games, and applications. Also in the illustrative embodiment, the screensavers, ringtones, and games are subdivided further into subcategories. The categories and subcategories allow users to navigate to a subset of the data files that suit their interests without having to view information about data files that are outside their area of interest. Further in the illustrative embodiment, the user may word search the data files and/or sort the data files in a variety of ways in order to expedite locating data files of interest.

Additional features, which alone or in combination with any other feature(s), including those listed above, may comprise patentable subject matter and will become apparent to those skilled in the art upon consideration of the following detailed description of an illustrative embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
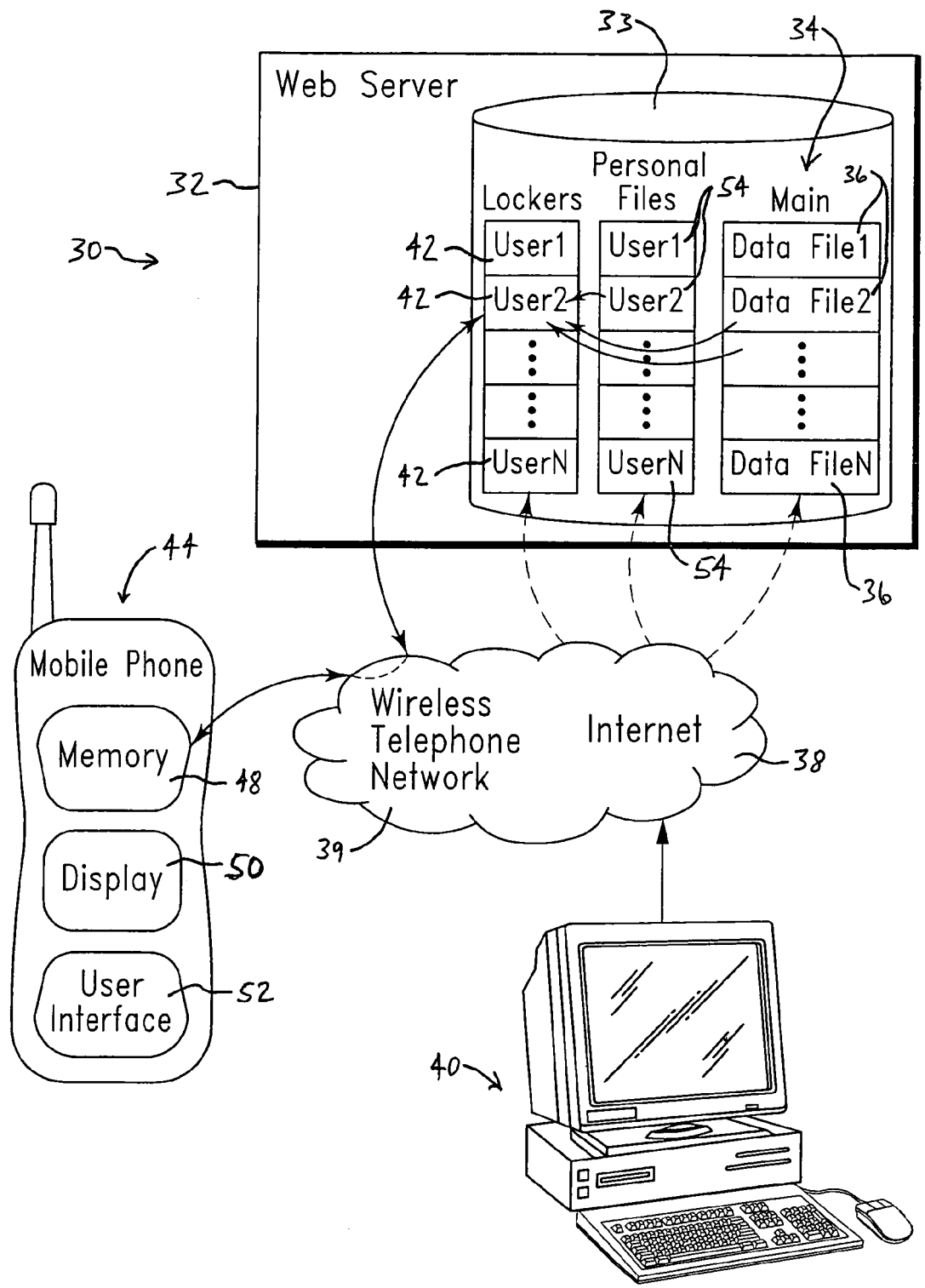
FIG. 1 is a diagrammatic view of a system for providing data files to mobile phones of users showing a web server that establishes a website having associated therewith a main library of data files, a locker for each user, and a personal file for each user, a general purpose computer that access the web server via the internet to control placement of data files into the associated locker, and a mobile phone that accesses the web server to obtain data files from the associated locker.

A system 30 in accordance with this disclosure comprises a web server 32 having associated therewith a database 33 with a main library 34 of data files 36 as shown diagrammatically in FIG. 1. Server 32 has software that, when executed, establishes a website that is connected to the internet 38 thereby enabling users having general purpose computers, such as illustrative personal computer 40, with appropriate web browser software to access the website established by server 32. Server 32 also has software that operates to establish a user-specific data locker 42 for each user that sets up an account as a user or subscriber of the website using their computer 40. Each data locker 42 comprises memory that is allocated by server 32. Server 32 is configured to permit users who access the website with their computer 40 to view data files 36, or subsets of data files 36 as described below, and to place or copy user-selected data files 36 into their locker 42.

After a user has populated their user-specific locker 42 with one or more user-selected data files 36 of interest, the user may access their locker 42 with a web-enabled mobile telephone 44 and download any of the data files 36 from their locker 42 to their mobile phone 44. The terms "mobile telephone(s)" or "mobile phone(s)" as used in this disclosure, including in the claims, are intended to mean all types of wireless voice communication devices, such as cellular telephones, satellite telephones and the like as well as, personal data assistants (PDA's) and similar such devices that are able to function as wireless phones. The term "general purpose computer" is intended to broadly cover all types of computers that may be used to browse the internet and access websites, including personal computers, laptop computers, PDA's, and the like. The software of server 32, therefore, supports internet-based communications with general purpose computers 40 and with mobile phones 44.

Although illustrative system 30 is shown as comprising one server 32 (e.g. a PC-based server, a minicomputer, a midrange computer, a mainframe computer, and the like), it is within the scope of this disclosure for system 30 to have one or more additional servers that are networked to server 32 and to have additional computer devices (e.g. desktop or PC-based computers, workstations, and the like) coupled to the network and to server 32. In one embodiment, system 30 has two servers, one of which is primarily responsible for establishing the website that is accessible to computers 40 and phones 44 (i.e., a "web server") and the other of which is primarily responsible for establishing database 33 (i.e., an "SQL server"). The one or more servers 32 of system 30 each include a central processing unit (CPU), such as a Dual Zeon processor made by Intel Corporation, as well as memory devices (e.g. RAM, ROM, cache memory, non-volatile memory, and the like) which are used to provide database 33 of system 30. Thus, the term "server 32" used herein is intended to cover single servers and multiple servers 32. System 30 may also have one or more peripheral components (e.g. a display screen, a printer, a mouse, a keyboard, and the like) coupled to server 32. System 30 optionally may further include other types of storage devices such as floppy or removable disk drives, a direct access storage device (DASD), a hard disk drive, a CD drive, a DVD drive, a tape drive, and the like that are included in, associated with, or coupled to server 32 and that read data stored on the corresponding type of data storage media (e.g. floppy disk, CD, DVD, tape, etc.). Thus, database 33 may comprise multiple storage devices that are networked together and networked to server 32, as well as comprising a portion of the memory of server 32.

As will be described in further detail below, when the associated user adds a new data file 36 to their locker 42, server 32 automatically sends a text message to the user's phone 44. The text message has a URL link to the associated user's locker 42. Thus, web server 32 is configured with software that operates to send the text message with the URL link to the user's phone 40. In one embodiment, the software that operates to send the text message with the URL link operates according to the Simple Transportation Management Protocol (STMP). Communication between server 32 and the phones 44 and computers 40 of various users is routed through pre-existing infrastructure associated with the internet 38 and/or a wireless telephone network 39 as shown diagrammatically in FIG. 1. It will be appreciated that data transmission lines, such as fiber optic lines, and other equipment, such as routers and the like, may be used by both wireless telephone network 39 and the internet 38 for communication of data and therefore, internet 38 and wireless telephone network 39 are illustrated diagrammatically in FIG. 1 as being interconnected.

Web server 32 is configured with the appropriate software and operates according to the appropriate communications protocols to utilize the infrastructure associated with internet 38 and network 39 to communicate with the computers 40 and phones 44 of users. These communications protocols are industry-standard protocols that may be modified or updated from time-to-time. Examples of protocols that may be used in various embodiments to permit server 32 to communicate via the internet 38 include IP, TCP, TCP/IP and HTTP. Examples of protocols that may be used in various embodiments to permit server 32 to communicate via wireless telephone network 39 include WAP 2.0 and RTP. The listed communications protocols are intended to be exemplary and not exhaustive. Hence the teachings of this disclosure are applicable regardless of the particular type of protocol used by system 30 to communicate with general purpose computers 40 and with mobile phones 44.

Illustrative mobile phone 44 includes memory 48, a display 50, and a user interface 52 as shown diagrammatically in FIG. 1. Display 50 may include any type of display although many popular mobile phones have color liquid crystal displays (LCD's). User interface 52 may comprise any type of interface that is operable by a user to input information or otherwise communicate with the circuitry of phone 44. Thus, examples of user interfaces 52 include key pads, buttons, toggles, switches, touch screens (activated by finger touch or stylus), and the like. In some instances, display 50 and user interface 52 may be combined into a common screen having a portion that serves as a touch screen to receive inputs from the user and having a portion that serves as a display to provide information to the user. In other instances, display 50 and user interface 52 may be combined into a screen that functions as a user interface 52 some of the time and that functions as a display 50 at other times. A portion of the memory 46 of phone 44 is usable memory that is accessible to users for storing data files downloaded to phone 44. Thus, data files 36 are stored in the usable memory 46 of phone 44 when downloaded thereto by a user.

According to this disclosure, system 30 is able to communicate with different types of mobile phones that are made by various manufacturers and that have their phone services provided by various mobile phone carriers. When each user becomes a subscriber to the website associated with server 32, among the various types of information that the user provides in setting up their account, is the type of carrier the user uses, the type of mobile phone 44 the user has, and the phone number of the user's mobile phone 44. Server 32 has software that appropriately formats the data files 36 based on the type of carrier and/or the type of mobile phone 44 each user has. The proper formatting for each data file 36 is dictated by the manufacturers of phones 44 and by the carriers. Such formatting may include, for example, embedding information into or adding information onto the core data portion or payload that comprises each data file 36. One example of formatting is adding information, such as the file name, file size, file location, and file type, as a header in front of the core data portion of the associated data file 36. Another example of formatting is changing the file size, such as by truncating a ringtone file to 2 kilobytes, so as not to exceed a maximum file size permitted by a particular carrier.

In one embodiment, data files 36 in library 34 are formatted for each type of mobile phone 44 and/or carrier (i.e., mobile phone service provider, such as Cingular Wireless, ATT&T Wireless, Sprint PCS, and T-Mobile) with which server 32 is able to communicate prior to any particular user selecting a data file 36 for downloading to the user's associated mobile phone 44 of a particular type. In another embodiment, data files 36 are formatted for a particular type of phone 44 and/or carrier when the first user having that particular type of phone selects a particular data file 36 for downloading to the phone 44. In such an embodiment, the formatted data file 36 is stored for use by system 30 when subsequent users, who have the same type of mobile phone 44 and/or carrier as the first user, select the same data file 36 for downloading that the first user selected. In still other embodiments, system 30 formats the data files 36 each time a user selects a particular data file 36 without storing the formatted data file 36 for subsequent users having the same type of mobile phones 44 and/or carrier as the previous users.

In addition to server 32 establishing user-specific lockers 42 for each user, server 32 also establishes a personal file 54 for each user as shown diagrammatically in FIG. 1. The personal file 54 for each user is separate from the associated user's locker 42 and comprises memory that is allocated by server 32. As will be described in further detail below, server 32 is configured to permit each user to upload files from their associated computer 40 to their personal file 54. In one embodiment, system 30 automatically copies to a particular user's locker 42 each file that the particular user uploads to their personal file 54 so that the user can access the uploaded file from their locker 42 via their mobile phone 44. An example of an uploaded file may be a photograph of a user's family that the user wishes to use as a screensaver. After the user downloads the "uploaded" file from their user-specific locker 42, the user may decide to delete the uploaded file from their locker 42. However, each uploaded file which a user uploads to their user-specific personal file 54 remains stored in their personal file 54, unless the user deletes the uploaded file by entering delete commands after accessing their personal file 54 via their computer 40. Thus, after deleting an uploaded file from their locker 42, a user may copy the uploaded file from their personal file 54 back to their locker 42 at a later point in time, assuming the user has not deleted the uploaded file from their personal file 54.

According to this disclosure, therefore, users operate their computers 40 to connect to system 30 via the website established by server 32 and place into their user-specific lockers 42 either data files 36 from library 34 or uploaded files from their user-specific personal files 54 or both. The files placed in each user's locker 42 are appropriately formatted by system 30 depending upon the associated user's type of mobile phone 44 and carrier. As a result of files being placed into a user's locker 42, system 30 sends a text message to the particular user's mobile phone and the text message includes a URL link to the user's locker 42. After the user selects the URL link on their mobile phone 44, a communication link between server 32 and the associated user's mobile phone 44 is established and the user may enter the appropriate commands on their mobile phone 44 to download the desired files to their mobile phone 44 for storage in the phone's memory 48. In the illustrative embodiment, users are able to access their lockers 42 via their mobile phones 44, but are not able to access their personal files 54 or library 34 via their mobile phones 44. Thus, in the illustrative embodiment, users do not have to use their mobile phones 44 to navigate or browse through portions of the website of system 30 having files that are not of interest to the user. That is, any files that a particular user may want to eventually download to their mobile phone 44 are first placed by the user into their user-specific data locker 42 by using their general purpose computer 40. Also in the illustrative embodiment, users are able to delete files from their lockers 42 using either their computers 40 or their mobile phones 44.

FIGS. 2–18 show "computer" screen shots and FIGS. 19–26 show "phone" screen shots of various web pages of an illustrative website established by server 32 in accordance with this disclosure. The screen shots of FIGS. 2–18 are illustrative examples of the images that appear on the screens of the general purpose computers 40 of users after the users access the website of system 30 with their computers 40 and the screen shots of FIGS. 19–26 are illustrative examples of the images that appear on the displays 50 of the mobile phones 44 of users in connection with their interaction with the website of system 30 using their mobile phones 44.

The description below refers to various graphical or textual images, such as icons, buttons, hyperlinks, and the like that appear on various web pages, as being "selected." This disclosure is intended to cover all methods for selecting graphical or textual images appearing on a computer screen or on a display of a mobile phone. Selection of such graphical or textual images may be accomplished, for example, by moving a cursor to overlap a portion of the image to be selected and then clicking (or double clicking) a button on a computer mouse or on the mobile phone; by using left, right, up, and down arrow keys on a computer keyboard or on a mobile phone's user interface to highlight various images and then pressing an "Enter" key (or other appropriate key) of the keyboard or phone when the desired image is highlighted; by using a "Tab" key on a computer keyboard to highlight various images and then pressing an "Enter" key (or other appropriate key) of the keyboard when the desired image is highlighted; by touching a computer screen or mobile phone display screen with a light pen or stylus on the portion of the screen having the desired image; using voice control software to select the desired image verbally; and, if the computer screen or mobile phone display screen is a touch screen, touching the portion of the touch screen having the desired image. In the description below, when it is stated that a particular web page or other information "appears" on the user's computer screen or mobile phone display screen, and when it is stated that "server 32" or "system 30" "responds with" a particular page or information on the user's computer screen or mobile phone display screen, or other similar such statements, such statements mean that server 32 is transmitting data to the user's computer 40 or phone 44 to cause the web page or information to appear on the user's computer screen or mobile phone display screen, respectively.

Figure 2:
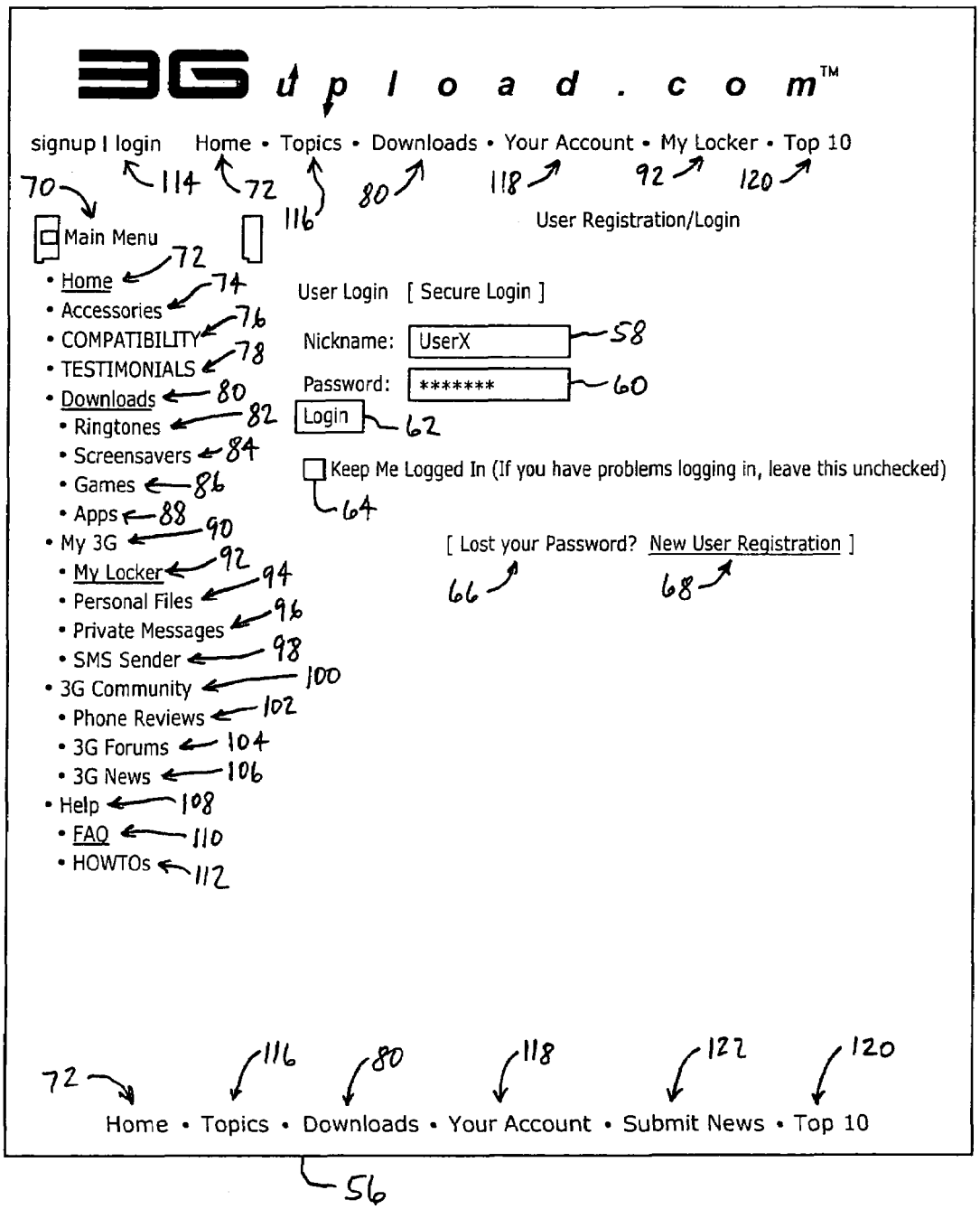
FIG. 2 is a screen shot of a Login page of the website.

Referring now to FIG. 2, a Login page 56 of the website has a Nickname (i.e., user I.D.) block 58 in which users accessing the website enter their user I.D.'s and a Password block 60 in which users enter their password. Page 56 also has a Login button 62 that each user selects after entering the proper information in blocks 58, 60 in order to access each of the following: the main library 34 of data files 36, their user-specific data locker 42, and their user-specific personal file 54. Page 56 also has a "Keep Me Logged In" check box that may be checked by each user so that the user does not need to log in during subsequent visits to the website using the same computer 40.

Page 56 has a "Lost your Password?" icon 66 that users may select to be notified of their password after correctly answering one or more predetermined questions established by system 30 at the time the user initially set up their account. Page 56 further has a "New User Registration" icon 68 that users may select to set up their account on the website. Page 56 has a Main Menu 70 including a Home icon 72, an Accessories icon 74, a Compatibility icon 76, a Testimonials icon 78, a Downloads icon 80, a Ringtones icon 82, a Screensavers icon 84, a Games icon 86, an Apps icon 88, a "My 3G" icon 90, a "My Locker" icon 92, a "Personal Files" icon 94, a "Private Messages" icon 96, an "SMS Sender" icon 98, a "3G Community" icon 100, a "Phone Reviews" icon 102, a "3G Forums" icon 104, a "3G News" icon 106, a Help icon 108, a FAQ (i.e., Frequently Asked Questions) icon 110, and a HOWTOs icon 112. Page 56 additionally has a signup/login icon 114, a Topics icon 116, a "Your Account" icon 118, and a "Top 10" icon 120. Icons 114, 116, 118, 120 appear near the top of page 56 alongside duplicates of icons 72, 80, 92 from menu 70. Near the bottom of page 56 are another duplicate of icons 72, 80, 116, 118, 120, but a "Submit News" icon 122 also appears near the bottom of page 56.

Each of the icons 72, 74, 76, 78, 80, 82, 84, 86, 88, 90, 92, 94, 96, 98, 100, 102, 104, 106, 108, 110, 112 in menu 70 and each of the other icons 114, 116, 118, 120, 122 on page 56 appear on a number of different web pages of the website, in addition to appearing on page 56. Each of these icons may be selected by a user at any time to link to the associated page or web pages associated with the icon. Thus, each of icons 72, 74, 76, 78, 80, 82, 84, 86, 88, 90, 92, 94, 96, 98, 100, 102, 104, 106, 108, 110, 112, 114, 116, 118, 120, 122 is a hyperlink to other web pages of the website of system 30. The description below of the information and/or functions associated with each of icons 72, 74, 76, 78, 80, 82, 84, 86, 88, 90, 92, 94, 96, 98, 100, 102, 104, 106, 108, 110, 112, 114, 116, 118, 120, 122 is applicable regardless of what web page a user happens to be viewing when the icon is selected, unless specifically noted otherwise.

If the user selects Home icon 72, server 32 responds with a Home page (not shown) of the website. The Home page is the initial page that appears on the user's computer 40 when the user links to the website of server 32 after entering the website URL (universal resource locator) on the user's computer 40 in the appropriate field. The Home page includes main menu 70 and also includes a signup/login icon 114 similar to that shown on page 56. In order to access the pages of the website that permit a user to place files in their locker 42 or personal file 54, the user must first log in via page 56 by entering the appropriate information in blocks 58, 60 as mentioned above. Of course, if the user has checked box 64 during a previous visit to the website, the user will be logged in automatically upon returning to the website using the same computer 40.

If the user selects Accessories icon 74 on menu 70, server 32 responds with a first page (not shown) of a large number of pages (not shown) having lists and/or images of accessories that the user may wish to buy over the internet 38. For the most part, these items are accessories of the type associated with mobile phones, and therefore, include items such as phone charger cords, phone holsters, phone cases, phone attachment clips, antennas, batteries, faceplates, phone key pads, hands-free headsets, and the like. The accessories pages of the website of system 30 also list the price of each item and a Buy Now icon that when selected by the user initiates the buying process for the selected item.

If the user selects Compatibility icon 76 on menu 70, server 32 responds with a Carrier web page (not shown) that lists the mobile phone carriers with which system 30 is compatible for downloading files. In one embodiment (i.e., a commercial embodiment of system 30 located at the URL www.3GUpload.com), system 30 is compatible with the following mobile phone carriers: Sprint PCS, AT&T Wireless, Cingular Wireless, and T-Mobile. A Carrier icon for each of these carriers is provided and when any of the Carrier icons are selected by the user, system 30 responds with a list of the types of phones that are compatible with the associated carrier. In one embodiment, when the user selects the Carrier icon associated with Sprint PCS, system 30 responds with a first Phone List page that lists the following types of mobile phones, along with images of each of the phones, that are compatible with Sprint PCS: Audiovox CDM-9950/Toshiba VM4050, Hitachi G1000, Hitachi P300, LG 5350, Samsung A500, Samsung A600, Samsung A620, Samsung A660/Vi660, Samsung N400, Samsung VGA1000, Sanyo 4900, Sanyo 5300, Sanyo 5400/rl2500, Sanyo 5500/vm4500, Sanyo 6400, Sanyo 7200, Sanyo 8100, Sony T608, and Treo 600. In this embodiment, when the user selects the Carrier icon associated with AT&T Wireless, system 30 responds with a second Phone List page that lists the following types of mobile phones, along with images of each of the phones, that are compatible with AT&T Wireless: Motorola C333, Motorola MPX200, Motorola T720, Motorola T721, NEC 525, Nokia 3100, Nokia 3300, Nokia 3595, Nokia 3600/3620/3650, Nokia 6200, Nokia 6800, Nokia 7210, Nokia N-Gage, Panasonic GD87/GU87, Samsung SGH-X426/SGH-427, Samsung V206, Siemens S56, Siemens C56, Siemens M56, Siemens SL56, Siemens SX56, Sony Ericsson T226, Sony Ericsson T306, Sony Ericsson T616, and Treo 600(GSM). Further in this embodiment, when the user selects the Carrier icon associated with Cingular Wireless, system 30 responds with a third Phone List page that lists the following types of mobile phones, along with images of each of the phones, that are compatible with Cingular Wireless: LG G4050, Motorola C350q/C353/C359 (GSM), Motorola T720, Nokia 3300, Nokia 3595, Nokia 3600/3620/3650, Nokia 6100, Nokia 6200, Nokia 6800, Nokia N-Gage, Samsung S307, Samsung SGH-X426/SGH-X427, Siemens A56, Siemens CT56, Siemens S56, Siemens SL56, Sony Ericsson T226, Sony Ericsson T306, Sony Ericsson T316, Sony Ericsson T616, and Treo 600 (GSM). Also in this embodiment, when the user selects the Carrier icon associated with T-Mobile, system 30 responds with a fourth Phone List page that lists the following types of mobile phones, along with images of each of the phones, that are compatible with T-Mobile: Motorola C332, Motorola T720i/T722i, Motorola V300, Nokia 3595, Nokia 3600/3620/3650, Nokia 6610, Nokia N-Gage, Samsung E105, Samsung E715, Samsung S105, Samsung V205, Samsung X105, Sony Ericsson T300, Sony Ericsson T610, and Treo 600 (GSM).

The various carriers and mobile phone models have been listed in the preceding paragraph to demonstrate that system 30 is compatible with multiple mobile phone carriers and with a large number of mobile phone models made by a variety of manufacturers. It will be appreciated that, from time-to-time, manufacturers will introduce new models of mobile phones, manufacturers others than those listed may begin to market mobile phones, other carriers may be formed to compete with the listed carriers, and some of the carriers and/or manufacturers listed may go out of business. Thus, the capability of system 30 may be updated from time-to-time based on the ever-changing marketplace. However, the basic operation of system 30 to allow users to place data files 36 into their lockers 42 and then to send a text message to the mobile phones 44 of users with a URL link to their user-specific locker 42 for downloading to their mobile phones 44 the data files 36 placed therein is applicable regardless of the carrier and type of phone the user has, so long as system 30 is able to appropriately format the data files 36 to be compatible with each user's carrier and type of phone.

If the user selects Testimonials icon 78, server 32 responds with a web page (not shown) having a number of testimonials by other users regarding positive experiences they've had using the website or accolades for the website. If the user selects "My 3G" icon 90, system 30 responds with a web page that permits a user to change the user's account information, such as e-mail address, password, carrier, phone type, and so on. Thus, if a user obtains a new type of mobile phone, or changes carriers, the user may change their account via the web page accessed by selecting the "My 3G" icon, thereby avoiding having to set up a new account, which would entail a new subscription fee. If the user selects "Private Messages" icon 96, system 30 responds with a web page (not shown) showing any e-mails or messages that have been sent to the user, such as, for example, either a message from the administrator of the website regarding some aspect of the user's account or a message from another user.

If the user selects "SMS Sender" icon 98, server 32 responds with a Text Messaging web page (not shown) that permits the user to send a text message to another person's mobile phone, regardless of whether the message recipient is a subscriber of the website of system 30. The Text Messaging web page has a "Pick Provider" text block, with an associated drop down menu from which the user may pick the message recipient's type of carrier from among any of the following carriers: Sprint PCS, Verizon, AT&T, T-Mobile, Nextel, Cingular, Qwest, Skytel, Metrocall, and Arch. The Text Messaging web page also has a Phone Number text block in which the message recipient's mobile phone number is entered. The Text Messaging web page further has a From text block which includes two fields, one of which is used by the user to enter their mobile phone number and the other of which is used by the user to enter the name of their carrier. The Text Messaging web page has a "Pre-Made Messages" text block with an associated drop down menu from which the user may pick a system-provided message to send to the recipient from among the following set of system-provided messages: "Call me ASAP!," "Call home," "Call work," "I'm going to," "Meet me at," "I'll be there at," "I love you," "Hugs and kisses OXOX," "Where are you?," "Can you talk?," "Can't talk now, msg me," "Running late, on my way." The Text Messaging web page further has a Message text block in which the user may type their own message, up to 100 characters, or type additional text to be appended to a system-provided message. After the text blocks of the Text Messaging web page are filled out by the user to the user's satisfaction, the user selects a "Send Message" button on the Text Messaging web page and system 30 responds by sending the text message to the recipient.

If the user selects "3G Community" icon 100, system 30 responds with a web page (not shown) that provides the user with a number of links to a number of grouped message threads in which users exchange messages regarding an associated topic. The topics are broken down into a number of main topics and subtopics under each main topic. For example, under the main topic of "The Site" are links to messages regarding the following subtopics: News and Information, Instructions and Notes, Site Bugs, Questions, and Suggestions. Under the main topic of "General" are links to messages regarding the following subtopics: How-to's, Tips and Tricks, Everything Else, Requests, Phones, and Singles. Under the main topic of "The Marketplace" is a link to messages regarding the subcategory of Buy and Sell. Under the main topic of "Wireless Providers" are links to messages regarding the following subtopics: Sprint PCS, AT&T, Cingular, and T-Mobile. If a user selects a subtopic, the user links to messages posted by other users regarding the subtopic and has the option of posting their own message regarding the subtopic.

If the user selects "Phone Reviews" icon 102, system 30 responds with a web page (not shown) that provides links to user-posted reviews of a large number of different types of mobile phones. If the user selects "3G Forums" icon 104, system 30 responds with the same web page as when the user selects "3G Community" icon 100. If the user selects "3G News" icon 106, system 30 responds with a web page that has links to a number of topic icons which, when selected, have messages from the administrator of system 30 regarding various topics. In one embodiment, the topic icons include the following: Announcements, Site Bugs, Download of the Week, Humor, Ideas, Links, Software, News About Sprint PCS, and Testimonials. If the user selects "Help" icon 108, system 30 responds with a web page that provides users with links to answers to common questions and also contains a set of text blocks that permit a user to create a ticket to be sent to the system administrator with a message explaining a particular problem that the user is having with the website.

If the user selects FAQ icon 110, system 30 responds with a web page (not shown) listing the following categories that are selectable by the user to link to additional web pages listing questions and answers that are frequently asked pertaining to the selected category: Personal Files, Downloads, 3G Locker, and General. If the user selects "HOW-TOs" icon 112, system 30 responds with a web page (not shown) having links to additional web pages that explain how to use the website to download files to mobile phones and that explain how to use certain other websites and software to download files to mobile phones. If the user selects "Signup/Login" icon 114, system 30 responds with Login page 56 described above. If the user selects Topics icon 116, system 30 responds with the same web page as when the user selects "3G News" icon 106. If the user selects "Your Account" icon 118, system 30 responds with a web page (not shown) that permits the user to send a private message to other users and that lists the following information about the user's account: Last 10 Comments by the user, Last 10 Forums Topics Started by the user, Last 10 News Submissions sent by the user, Last 10 Download Submissions by the user, and Last 10 Web Links submitted by the user.

If the user selects "Submit News" icon 122, server 32 responds with a web page having text boxes in which the user may type an article or story that the user desires to have posted on the website. The user may select a topic from a drop down menu, if desired, and the user is able to preview and submit their article or story to the system administrator for review and possible posting on the website. If approved, the system administrator will make the user's submitted article or story available for viewing by other users on the web page associated with the "3G News" icon 106.

Based on the above description, it will be appreciated that the web pages associated with icons 70, 72, 74, 76, 78, 90, 96, 98, 100, 102, 104, 106, 108, 110, 112, 114, 116, 118, 120, 122 are, for the most part, administrative and/or informational in nature. Examples of the web pages associated with icons 80, 82, 84, 86, 88, 92, 94 are shown in FIGS. 3–18 and are the primary web pages of system 30 that are associated with selection and management by users of data files 36 from library 34 and uploading by user of data files from their computers 40.

If the user has not logged in to the website established by system 30 when the user selects one of icons 80, 82, 84, 86, 88, 92, 94, then system 30 responds with Login page 56. The user may then log in to the website, as described above, and thereafter select any of icons 80, 82, 84, 86, 88, 92, 94 which results in system 30 responding in the manner described below for each of these icons.

Figure 3:
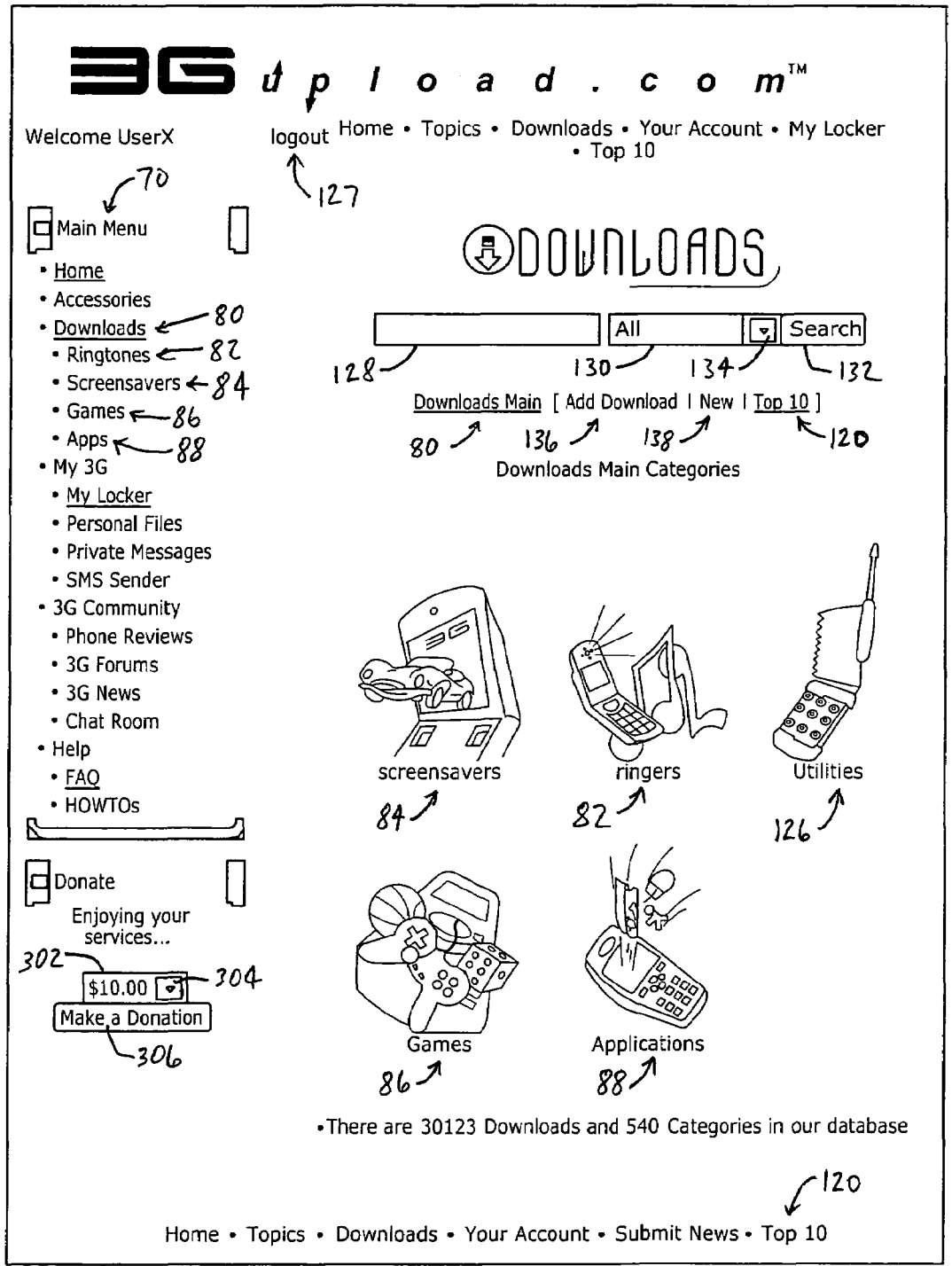
FIG. 3 is a screen shot of a Main Menu page of the website showing icons corresponding to the main categories of data files in the main library.

If, after logging in by entering the proper information in boxes 58, 60 of page 56 and by selecting button 62, a user selects Downloads icon 80, server 32 responds with a Main Menu page 124 as shown, for example, in FIG. 3. Page 124 has icons corresponding to the main categories of data files 36 in the main library 34. Four of the illustrative icons of the main categories correspond to icons 82, 84, 86, 88 of main menu 70 and therefore, the same reference numbers are used to denote these in FIG. 3. Page 124 also has a Utilities icon 126. Page 124 further has a "Downloads Main" icon and a "Top 10" icon that correspond to icons 80, 120, respectively, of menu 70 and therefore, are denoted by the same reference numbers. Page 124, as well as other pages of the website that appear on the screen of the user's computer 40 after the user logs in, includes a "Logout icon" 127 that the user may select, if desired, to log out of the portion of the website that permits the user to have access to library 34, their locker 42, and their personal file 54.

Page 124 also has a first Search text box 128, a second Search text box 130, and a Search button 132. The user may type one or more search terms in box 128 and may choose for placement in box 130, one of the categories listed in a drop down menu that appears in response to the user selecting drop down arrow 134. The categories of data files 36 listed in the drop down menu associated with drop arrow 134 include All, Ringers by Title, Ringers by Artist, Screensavers, Games, and Applications. After the user enters the desired search criteria in the Search text boxes 128, 130, the user selects Search button 132 and system 30 responds with the results of the search. The user may then select any of the data files 36 uncovered in the search for placement in the user's locker 42. The preceding description of the functions and uses associated with text boxes 128, 130, button 132, and drop down arrow 134 appearing on page 124 is applicable to all of the pages of the website on which text boxes 128, 130, button 132, and drop down arrow 134 appear.

Figure 4:
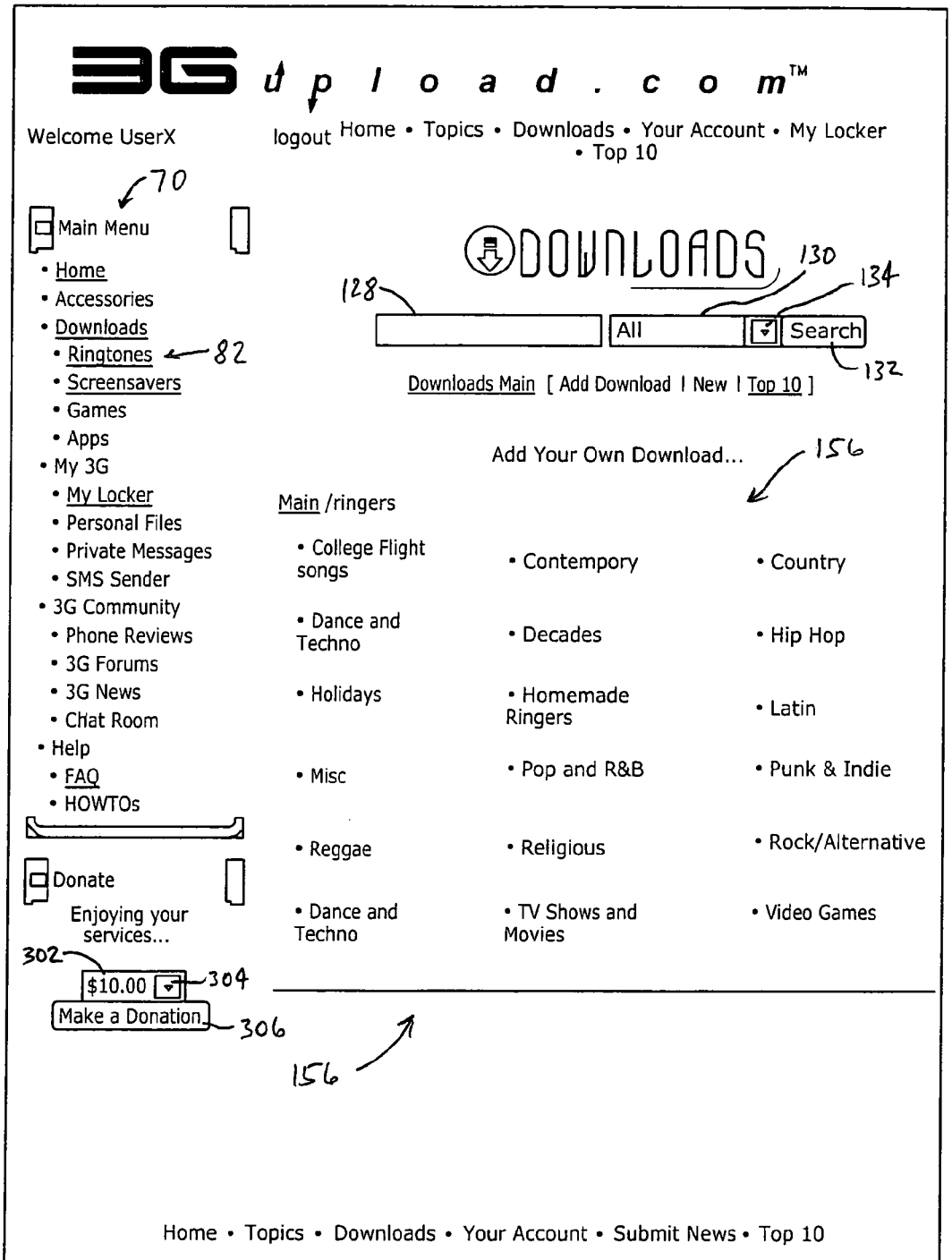
FIG. 4 is a screen shot of a Ringtone Menu page of the website showing subcategories of available ringtone data files, each subcategory of ringtone data files corresponding, in many instances, to a particular genre of music.

If the user selects "Top 10" icon 120, server 32 responds with a Top 10 web page 140 as shown, for example, in FIG. 4. Page 140 has a "Top 10 Ringers" drop down arrow 142 that, when selected, causes system 30 to respond with a menu of different subcategories of music that may be selected by the user to list the top 10 ringtones that other users have downloaded to their mobile phones 44 for the selected subcategory of music from the menu. Page 140 also has a "Top 10 Screensavers" drop down arrow 144 that, when selected, causes system 30 to respond with a menu of different subcategories of screensavers that may be selected by the user to list the top 10 screensavers that other users have downloaded to their mobile phones 44 for the selected subcategory of screensavers from the list. Boxes 128, 130, button 132, and drop down arrow 134 also appear on page 140 as shown in FIG. 5.

Figure 5:
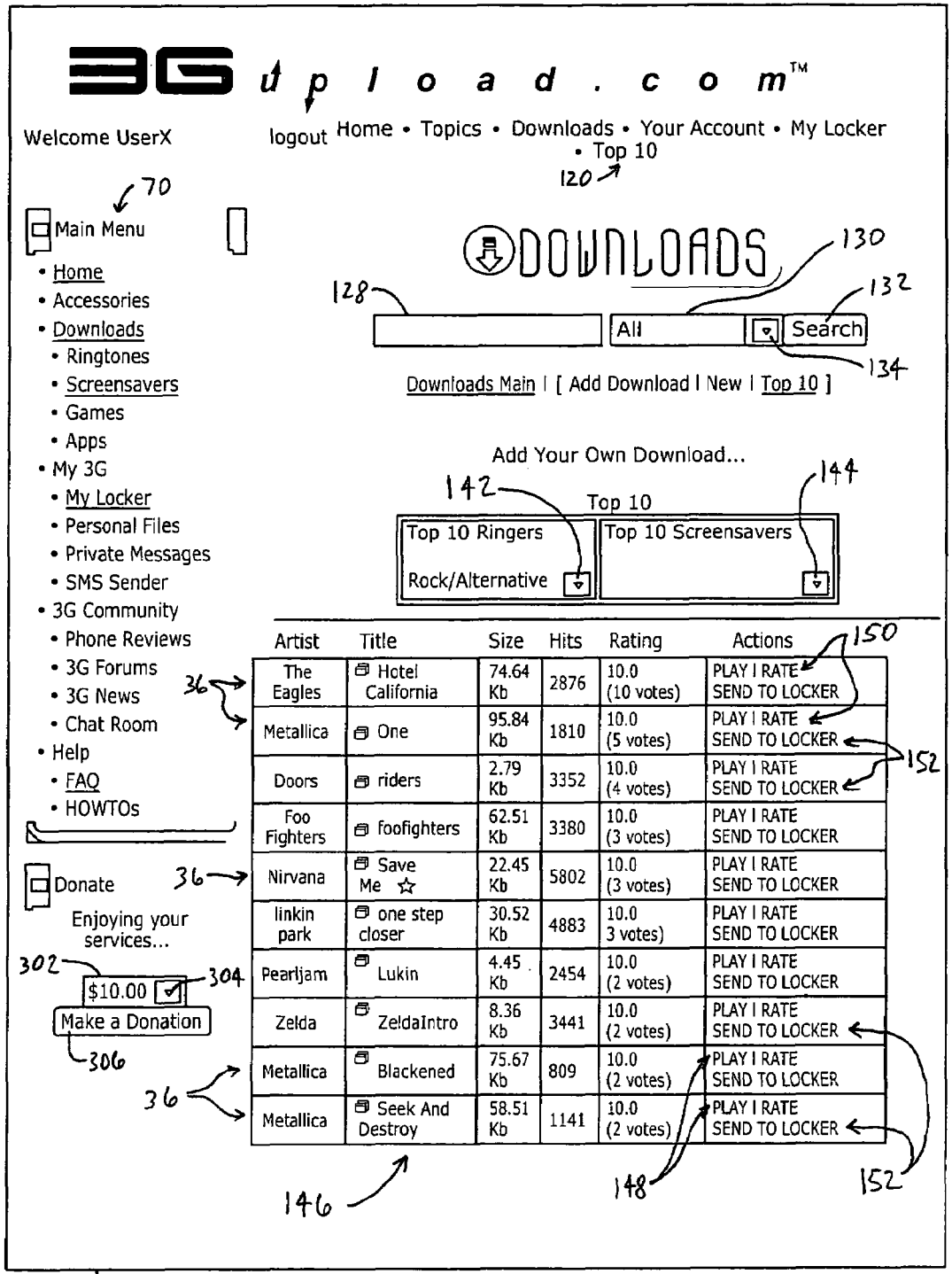
FIG. 5 is a screen shot of a Ringtone Top 10 page of the website showing the top ten most popular ringtone data files on the website.

In the illustrative example of page 140 in FIG. 5, the "Rock/Alternative" subcategory of music has been selected from the menu associated with drop down arrow 142 and system 30 has responded with a table 146 showing the top 10 ringtones in the "Rock/Alternative" subcategory of data files 36 available in library 34 of database 33. Each row in table 146 corresponds to a particular ringtone file of available data files 36. The columns of table 146 are labeled, from left to right, Artist, Title, Size, Hits, Rating, and Actions. The Artist column lists the musical group, or individual performer, that performed the song upon which the ringtone listed in the Title Column is based. The Size column lists, in kilobytes, the size of the associated data file 36. The Hits column lists the number of times the particular data file 36 has been downloaded to the mobile phones 44 of users. The Rating column lists the average rating (on a scale of 1 to 10) of the ringtone by users who have taken the steps to rate the ringtone and the Rating column also indicates, in parenthesis, the number of users who have rated the ringtone. The Actions column has a Play icon 148, a Rate icon 150, and a "Send to Locker" icon 152.

If the user selects Play icon 148, system 30 responds by playing the selected data file 36 so that the user can hear it on one or more speakers or headphones or the like associated with the user's computer 40. While the ringtone data file 36 plays on the user's computer 40, a control window appears on the screen of the user's computer 40 so that the user can pause, stop, fast forward, reverse, or play (after pausing or stopping) by selecting the appropriate icons of the control window associated with these functions. If the user selects Rate icon 150, system 30 responds with a web page (not shown) that allows the user to rate the associated data file 36 by selecting one of numbers 1 to 10 appearing in a drop down menu and to make a comment about the data file in a text box before selecting a "Rate this Resource" icon to submit the user's rating and comment.

If the user selects "Send to Locker" icon 152, system 30 responds by copying the associated data file 36 from the library 34 to the user's data locker 42. In connection with copying the selected data file 36 to the user's locker 42, system 30 executes the appropriate software, if necessary, to properly format the data file 36 based on the user's type of mobile phone 44 and/or type of carrier, as described above. Also as a result of the user selecting the "Send to Locker" icon 152, system 30 sends a text message to the user's mobile phone 44 with the appropriate URL link to the user's locker 42, assuming no errors are detected by system 30 during copying of the selected data file 36 to the user's locker 42. Thus, the "Send to Locker" icon 152 is the icon that each user selects to communicate to system 30 that the associated user wants to have that particular data file 36 included in their user-specific locker 42 for subsequent retrieval using their mobile phone 44.

Referring once again to FIG. 3, page 124 includes an "Add Download" icon 136 and a New icon 138. If the user selects icon 136, system 30 responds with a web page having a set of Add icons including an "Add Ringer" icon, an "Add Screensaver" icon, an "Add Animated Screensaver" icon, and an "Add Game or Application" icon. If the user selects one of the Add icons, system 30 responds with a web page having a Browse button that is associated with an Upload File text box. If the user selects the Browse button, a window appears on the screen of the user's computer 40 with a directory of all of the files (possibly grouped in folders, subdirectories, disk drives, hard drive, etc.) that are accessible on the user's computer 40. When the user has located, in the directory appearing on the user's computer 40, the file that the user wishes to upload to the website for inclusion by system 30 as one of the data files 36 in the main library 34, the user double-clicks on the file to be uploaded to system 30 and the file name will appear in the Upload File text box. Additional text boxes are provided so the user can (i) provide a title for the uploaded file, (ii) in the case of ringtone files, provide the name of the artist of the ringtone to be uploaded, (iii) identify the subcategory with which the user believes the uploaded file should be included from a menu of the relevant subcategories, and (iv) provide a description (up to 255 characters in one embodiment) of the file being uploaded.

In the preceding paragraph, the files that users provide to system 30 from their computers 40 have been referred to as being "uploaded." From the standpoint of system 30, these uploaded files become part of the library of files 36 that users can "download" from system 30 to their mobile phones 44. Hence, the use of the terminology "Add Download" in connection with icon 136.

If the user selects New icon 138, server 32 responds with a web page having icons that the user can select to see the data files 36 that have been added to database 33 within the past 1 week, 2 weeks, or 30 days. Depending upon which time period the user selects, system 30 has icons corresponding to each day within the selected time period and an indication of how many new files 36 were added to system 30 on the associated day. If the user selects one of the icons for a particular day, system 30 responds with a table (similar to the tables shown in FIGS. 5, 6, 8, 10, and 12 discussed below) showing the new files 36 that have been added to library 34 of database 33 on that particular day. The files 36 shown in this table may include any of the types of files which are available from system 30. If more than ten files have been added on a particular day, then a set of numbered page icons (i.e., 1, 2, 3, etc.) and a "Next Page" icon appear next to the phrase "Select Page." Thus, when more then ten files have been added on a particular day, system 30 will respond with the first page, but the user may select any of the numbered page icons or the "Next Page" icon to view additional files that have been added to system 30 on the selected day. On pages of files other than page 1 (i.e., the page associated with the "1" icon), a "Previous Page" icon (not shown) appears adjacent the phrase "Select Page." The "Next Page" icon and "Previous Page" icon are selected to advance by one page or to go back one page, respectively, from the current page being viewed, whereas any of the numbered page icons may be selected to go to directly to the selected page.

Assuming the user has logged in to the website established by server 32, if the user selects Ringtones icon 82 (which icon also uses the terminology "Ringers" on page 124), system 30 responds with a Ringtone Menu page 154 as shown, for example, in FIG. 4. Page 154 lists a menu 156 of icons corresponding to subcategories of available ringtone data files 36 (sometimes referred to herein as "ringtone files 36"), each subcategory of ringtone data files 36 in menu 156 corresponding, in most instances, to a particular genre of music. In the illustrative example, the subcategories for ringtone data files 36 include the following: College Fight songs, Contemporary, Country, Dance and Techno, Decades, Hip Hop, Holidays, Homemade Ringers, Latin, Misc., Pop and R&B, Punk & Indie, Reggae, Religious, Rock/Alternative, TV Shows and Movies, and Video Games. As is the case with all subcategory lists of data files 36 discussed herein, the list of ringtone subcategories associated with page 154 is not intended to be exhaustive, but rather to indicate that categories of data files 36 may be further subcategorized into a wide variety and/or large number of groups.

Figure 6:
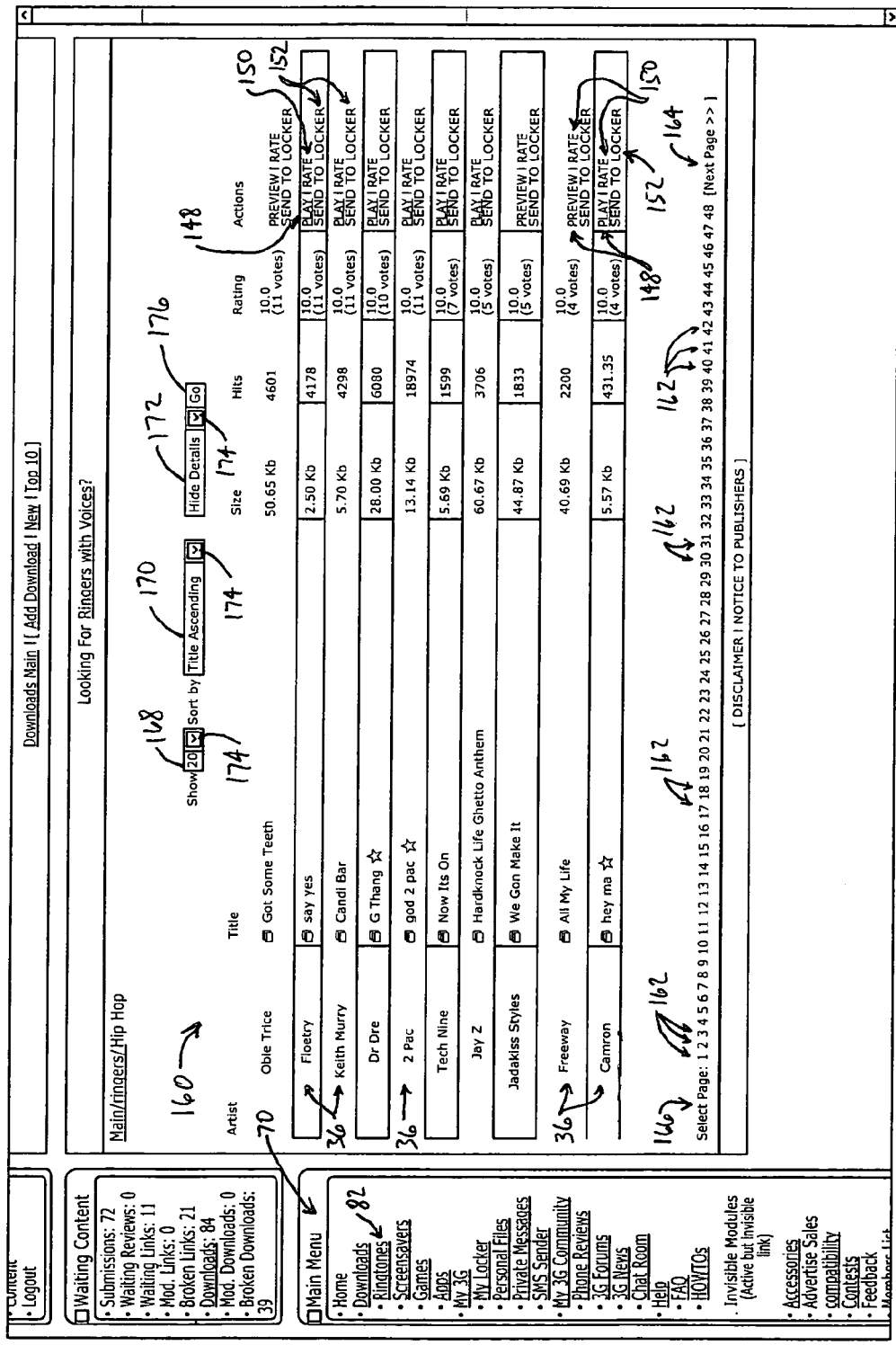
FIG. 6 is a screen shot of one of many Hip Hop pages of the website showing a set of data files from the main library that are selectable for placement in an associated locker of a user for possible downloading as a ringtone to an associated mobile phone of the user.

If the user selects any of the "subcategory" icons of menu 156, system 30 responds with a first page of a number of pages having lists of the data files 36 in the selected subcategory. For example, if on page 154, the user selects "Hip Hop" as the subcategory, system 30 responds with a first Hip Hop page 158 of many Hip Hop pages of the website as shown in FIG. 6. Page 158 includes a table 160 showing ten songs in the "Hip Hop" subcategory of data files 36 available in library 34 of database 33. Table 160 has a similar format to table 146 described above. Thus, each row in table 160 corresponds to a particular ringtone file of available data files 36. The columns of table 160 are labeled, from left to right, Artist, Title, Size, Hits, Rating, and Actions.

The Artist column lists the musical group or individual that performed the song listed in the Title Column. The Size column lists, in kilobytes, the size of the associated data file 36. The Hits column lists the number of times the particular data file 36 has been selected by users for placement in their lockers 42. The Rating column lists the average rating (on a scale of 1 to 10) of the ringtone by users who have taken the steps to rate the ringtone. The Actions column of table 160 has a Play icon 148 (or alternatively, a Preview icon 148 which is associated with the same function as the Play icon 148), a Rate icon 150, and a "Send to Locker" icon 150, as was the case with table 146 described above. Selection by a user of icons 148, 150, 152 of table 160 cause system 30 to respond in the same manner as described above in connection with the manner that system 30 responds when icons 148, 150, 152 of table 146 are selected by a user. Thus, the description above of the functions of system 30 associated with icons 148, 150, 152 of table 146 is applicable to table 160 and is not repeated again.

If more than ten files 36 are in library 34 for a particular subcategory of ringtones, then a set of numbered page icons 162 (i.e., 1, 2, 3, etc.) and a "Next Page" icon 164 appear next to the phrase "Select Page" 166 on page 158. In the illustrative example, icons 162, 164 and phrase 166 are positioned beneath table 160. The user may select any of the numbered page icons 162 or the "Next Page" icon 164 to view additional files that are stored in library 34 of database 33 in the associated subcategory of ringtone files 36. On pages of files other than page 1 (i.e., the page associated with the "1" icon 162), a "Previous Page" icon (not shown) appears adjacent phrase 166. The "Next Page" icon 164 and "Previous Page" icon are selected to advance by one page or to go back one page, respectively, from the current page being viewed, whereas any of the numbered page icons 162 may be selected to go to right to the selected page.

Page 158 has a Show box 168, a "Sort by" box 170, and a Details box 172 as shown in FIG. 6. Each of boxes 168, 170, 172 has an associated drop down menu icon 174. If the user selects drop down menu icon 174 associated with box 168 a menu appears with the number 10, 20, 30, and 40 and the user may pick how many ringtone files 36 should be shown in table 160 for each of icons 162 by selecting either 10, 20, 30, or 40 from the menu. When the user first links to page 158, system 30 defaults to showing 10 files in table 160. If the user selects 20, 30, or 40 from the menu associated with box 168, then a scroll bar is provided by system 30 adjacent the corresponding table 160, if necessary, to permit the user to scroll up or down to view additional files 36 in table 160 that are unable to be seen by the user due to size constraints of table 160 on the user's computer screen. Also, if the user selects 20, 30, or 40 from the menu associated with box 168, system adjusts the number of numbered page icons to correspond to the selected number. For example, if there are 500 files in a particular subcategory and system 30 shows 10 files per page, then a total of 50 numbered page icons (i.e., numbered sequentially 1 through 50) are shown adjacent phrase 166. However, if the user decides to show 20 files per page, then the same 500 files will be divided up by system 30 into 25 pages with associated number page icons that are numbered sequentially 1 through 25.

If the user selects drop down menu icon 174 associated with box 170, a menu appears with the following selectable sort options: Artist Ascending, Artist Descending, Title Ascending, Title Descending, Date Ascending, Date Descending, and Rating. The Artist Ascending and Title Ascending options sort the artist and title, respectively, in alphabetical order. The Artist Descending and Title Descending options sort the artist and title, respectively, in reverse alphabetical order. The Date Ascending option sorts the files 36 in the order they were added to system 30 (either by a user or by a systems administrator) with the most recently added ringtone file 36 being first and the oldest ringtone file 36 being last. The Date Descending option sorts the files 36 in the reverse order that they were added to system 30 with the oldest ringtone file 36 being first and the most recently added ringtone file 36 being last. The Rating option sorts the files 36 with the highest rated file 36 being first and the lowest rated file 36 being last.

If the user select drop down menu icon 174 associated with box 172, a menu appears giving the user the option to either "Hide Details" or "Show Details." If the "Show Details" option is selected, system 30 includes in each line item of table 160 a comment about each associated file 36. If the "Hide Details" option is selected, then system 30 does not show the comment associated with each file 36. After the user has selected the desired options for boxes 168, 170, 172, the user selects a Go button 176 of page 158 and system 30 responds by formatting table 160 in the manner indicated by the options selected in boxes 168, 170, 172. In an alternative embodiment, system 30 also includes on page 158 search text boxes and a search button on page 158 that function the same as search text boxes 128, 130 (and drop down arrow 134 associated with box 130) and search button 132 which were described above in connection with page 140 shown in FIG. 5.

The preceding description of the functions and uses associated with boxes 168, 170, 172, drop down menu icons 174, and button 176 appearing on page 158 of FIG. 6 is applicable to all of the pages of the website of system 30 on which boxes 168, 170, 172, icons 174, and button 176 appear. However, whereas the above description was provided in the context of modifying the presentation of the data associated with table 160 of ringtone files 36, the boxes 168, 170, 172, icons 174, and button 176 are used similarly in other instances to modify the presentation of the data associated with other tables of other types of files 36, such as screensaver files 36, game files 36, applications files 36, utilities files 36, and any other type of files 36 included in library 34.

Figure 7:
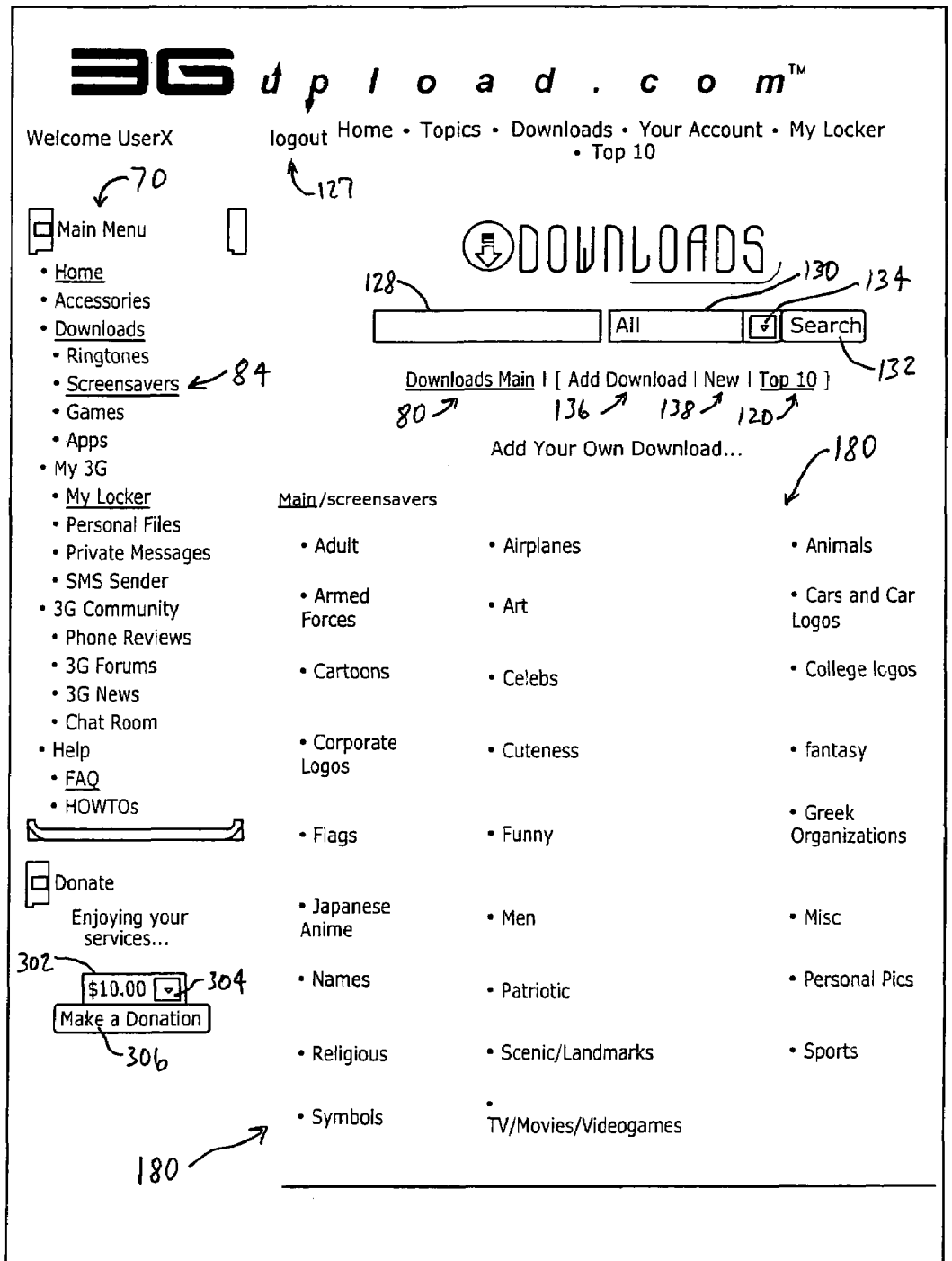
FIG. 7 is a screen shot of a Screensaver Menu page of the website showing subcategories of available screensaver data files, each subcategory of screensaver data files corresponding to a particular topic.

Assuming the user has logged in to the website established by server 32, if the user selects Screensavers icon 84, system 30 responds with a Screensaver Menu page 178 as shown, for example, in FIG. 7. Page 178 lists a menu 180 of icons corresponding to subcategories of available screensaver data files 36 (sometimes referred to herein as "screensaver files 36"), each subcategory of screensaver data files 36 in menu 180 corresponding to a particular topic. In the illustrative example, the subcategories for screensaver data files 36 include the following: Adult, Airplanes, Animals, Armed Forces, Art, Cars and Car Logos, Cartoons, Celebs, College Logos, Corporate Logos, Cuteness, Fantasy, Flags, Funny, Greek Organizations, Japanese Anime, Men, Misc., Names, Patriotic, Personal Pics, Religious, Scenic/Landmarks, Sports, Symbols, TV/Movies/Videogames. This illustrative list of screensaver subcategories associated with page 178 is not intended to be exhaustive, but rather to indicate that categories of screensaver files 36 may be subcategorized into a wide variety and/or large number of groups.

Figure 8:
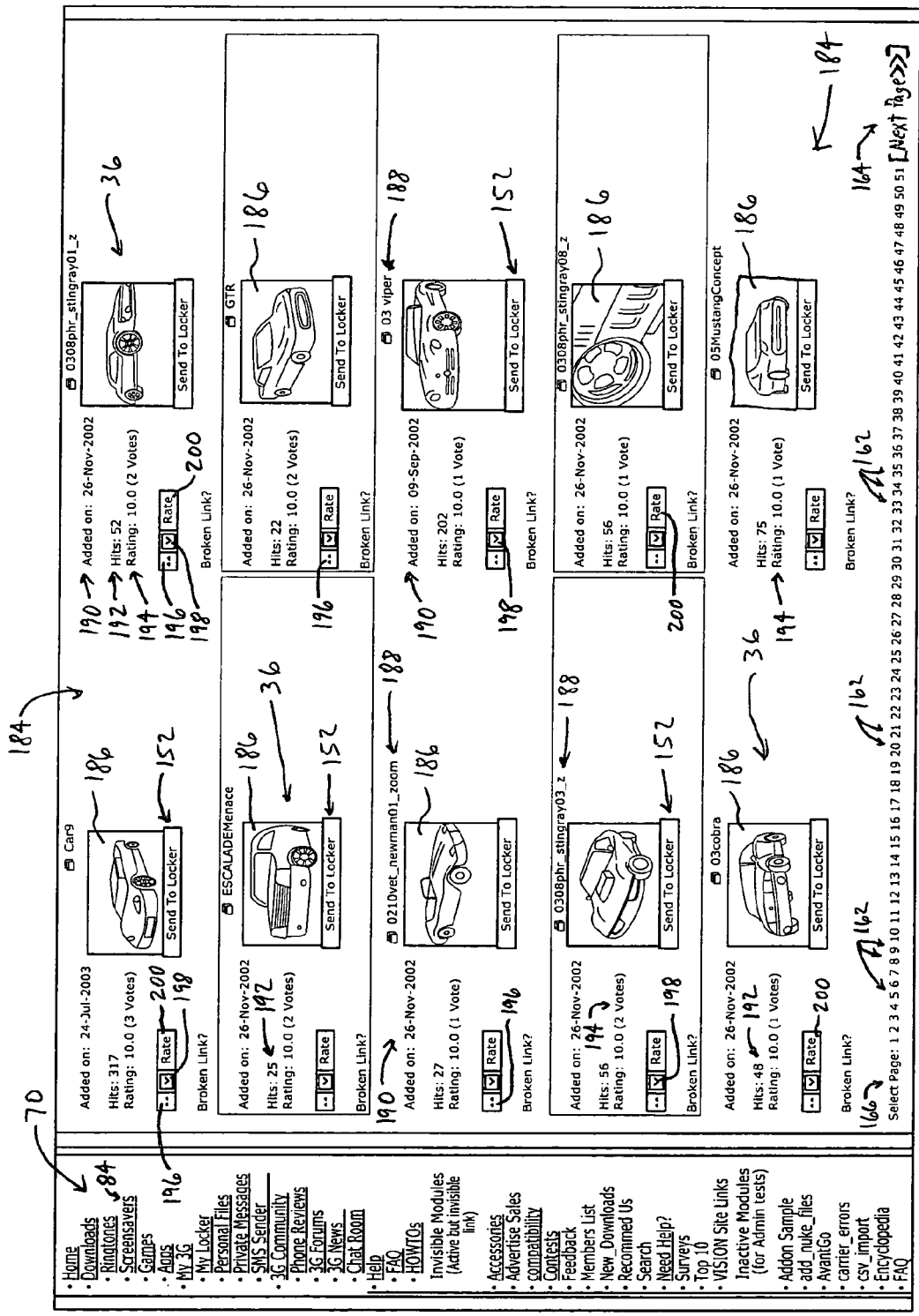
FIG. 8 is a screen shot of one of many Cars Images pages of the website showing a set of data files from the main library that are selectable for placement in an associated locker of a user for possible downloading as a screensaver to an associated mobile phone of the user.

If the user selects any of the "subcategory" icons of menu 180, system 30 responds with a first page of a number of pages having lists of the data files 36 in the selected subcategory. For example, if on page 178, the user selects "Cars and Car Logos" as the subcategory, system 30 responds with a first Cars Images page 182 of many Cars Images pages of the website as shown in FIG. 8. Page 182 includes a table 184, in two-column format, showing ten screensaver files 36 in the "Cars and Car Logos" subcategory of data files 36 available in library 34 of database 33.

Each screensaver file 36 appearing in table 184 includes a screensaver image 186 which is representative of the associated screensaver image that users will see on the displays 50 of their phones 44 if they take the steps to download the file 36 to their phones 44 as shown in FIG. 8. In the illustrative embodiment, "Send to Locker" icons 152 associated with each screensaver file 36 are positioned beneath each associated image 186. Selection of a particular icon 152 by a user results in system 30 responding with a Screensaver Size Selection page 210 as shown, for example, in FIG. 9. Page 210 includes a Proportional option 212 and an Exact Fit option 214. Option 212 has associated therewith a Proportional image 216 and a radio button 218 positioned beneath image 216. Similarly, option 214 has associated therewith an Exact fit image 220 and an associated radio button 222 positioned beneath image 220.

Figure 9:
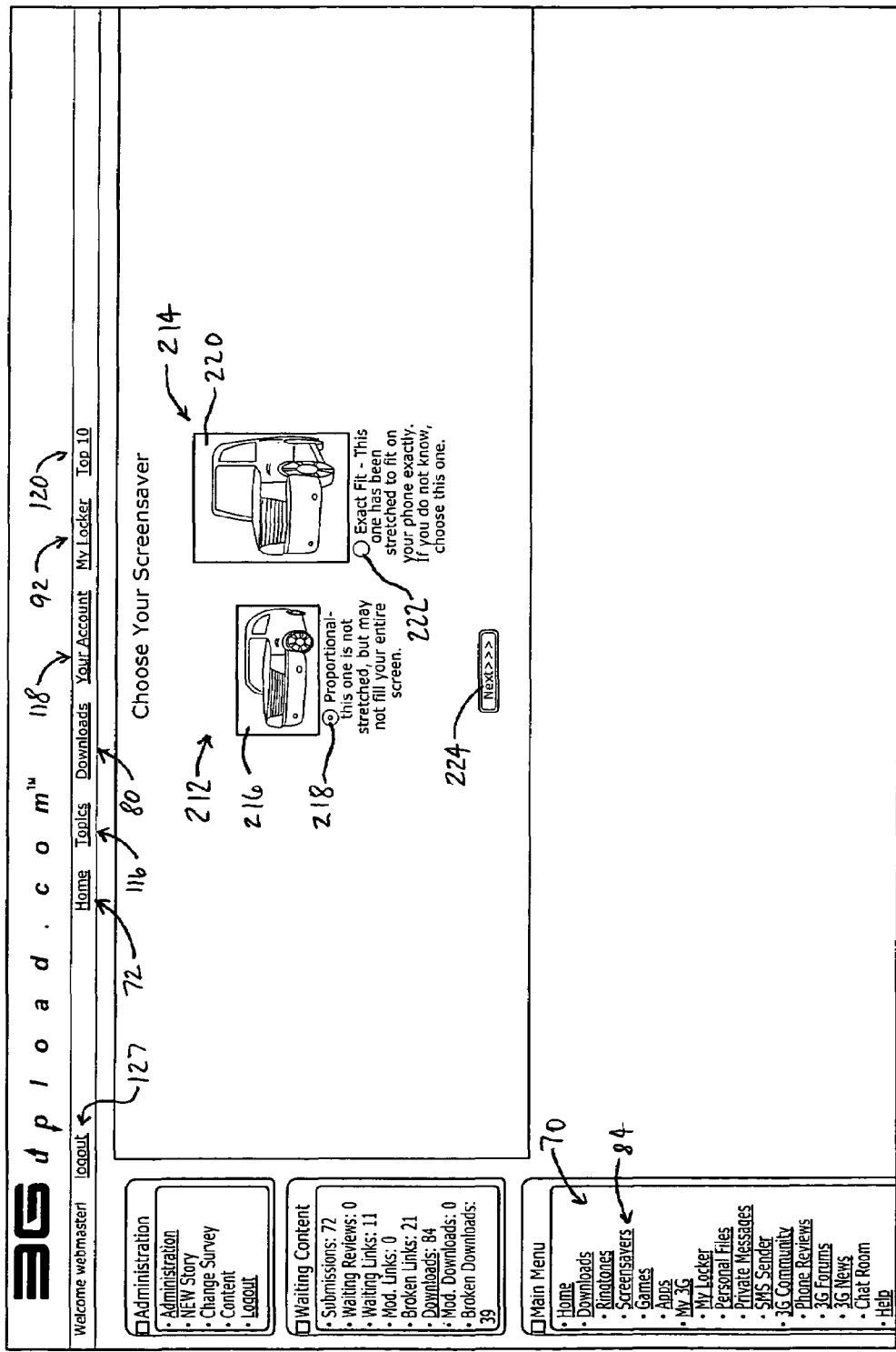
FIG. 9 is a screen shot of a Screensaver Size Selection page of the website showing a Proportional option and an Exact Fit option that are selectable by a user to indicate the size formatting of a screensaver image selected for placement in the user's locker.

If the user selects button 218 on page 210 of FIG. 9, system 30 responds by formatting the image 186 selected by the user on page 182 such that the image is not distorted or stretched, which means that the selected screensaver image 186 may not fill the entire display 50 of the user's phone 44. If, on the other hand, the user selects button 222, system responds by formatting the image 186 selected by the user on page 182 such that the image is distorted or stretched to fill substantially all of the display 50 of the user's phone. After the user selects one of buttons, 218, 222, the user selects a Next icon 224 and system 30 responds by copying the associated screensaver file 36 to the user's locker 42 with the size formatting indicated by the selected button 218, 222 and with any other formatting necessitated by the user's type of phone 44 and/or carrier. Also as a result of the user selecting icon 224, system 30 sends a text message to the user's phone with an appropriate URL link to the user's data locker 42. In addition, a web page (not shown) having informational text instructing the user regarding how to use their phone 44 to download desired data files 36 from their locker 42 to their phone 44 appears on the screen of the user's computer 40 in response to the user selecting Next icon 224 on page 210.

Referring once again to page 182 of FIG. 8, each screensaver file 36 appearing in table 184 also includes information corresponding to the filename 188, the "Added on" date 190 (i.e., the date that the file 36 was added to library 34 of system 30), the number of Hits 192 associated with the file 36 (i.e., the number of times users have placed the associated file 36 in their lockers 42), and Rating information 194 of the file 36, which includes the rating (based on the average, on a scale of 1 to 10, of the rating of users who have taken the steps to rate the screensaver) and the number of users who have rated the associated file 36. Associated with each file 36 in table 184 is a Rate box 196, a drop down arrow 198, and a Rate button 200. If the user wants to rate the associated screensaver file 36, the user (i) selects the corresponding drop down arrow 198, (ii) selects one of numbers 1 to 10 appearing in the resulting drop down menu (not shown) causing the selected number to appear in box 196, and then (iii) selects the Rate button 200. After each user rates a screensaver file 36, system updates the rating average appearing in the associated Rating information 194 on table 184 of page 182.

As was the case with ringtone files 36 described above, if more than ten files 36 are in library 34 for a particular subcategory of screensavers, then numbered page icons 162 (i.e., 1, 2, 3, etc.) and "Next Page" icon 164 appear next to the phrase "Select Page" 166 on page 182. In the illustrative example, icons 162, 164 and phrase 166 are positioned beneath table 184. The user may select any of the numbered page icons 162 or the "Next Page" icon 164 to view additional files that are stored in library 34 of database 33 in the associated subcategory of screensaver files 36. On pages of files other than page 1 (i.e., the page associated with the "1" icon 162), a "Previous Page" icon (not shown) appears adjacent phrase 166. The "Next Page" icon 164, "Previous Page" icon, and numbered page icons 162 operate in the same manner as described above in connection with page 158 and therefore, is not repeated again.

In some embodiments, subcatgories of ringtone files 36 and/or screensaver files 36 may be further subcatgorized. For example, in one embodiment, the "Cars and Car Logos" subcategory of screensaver files 36 is further divided into the following further subcategories: Cartoons and Funny Cars, Domestic, Engines, Import, Logos, Motorcycles, People an Cars, Racing, and Rimz. As another example, in one embodiment, the "Decades" subcategory of ringtone files 36 is further divided into the following further subcategories: '50's, '60's, '70's, and 80's. Still another example includes further subdividing the "Holidays" subcategory of ringtone files 36 into "Christmas" and "Halloween" subcategories. Thus, if a particular subcategory of files 36 is further subcategorized, then the user simply selects the desired further subcategory on the web page that results after the previous subcategory icon was selected, and then, system 30 responds, at that point, with pages similar to illustrative pages 158 or 182 depending upon whether Ringtone icon 82 or Screensaves icon 84, respectively, was selected initially by the user to begin the file selection process.

Figure 10:
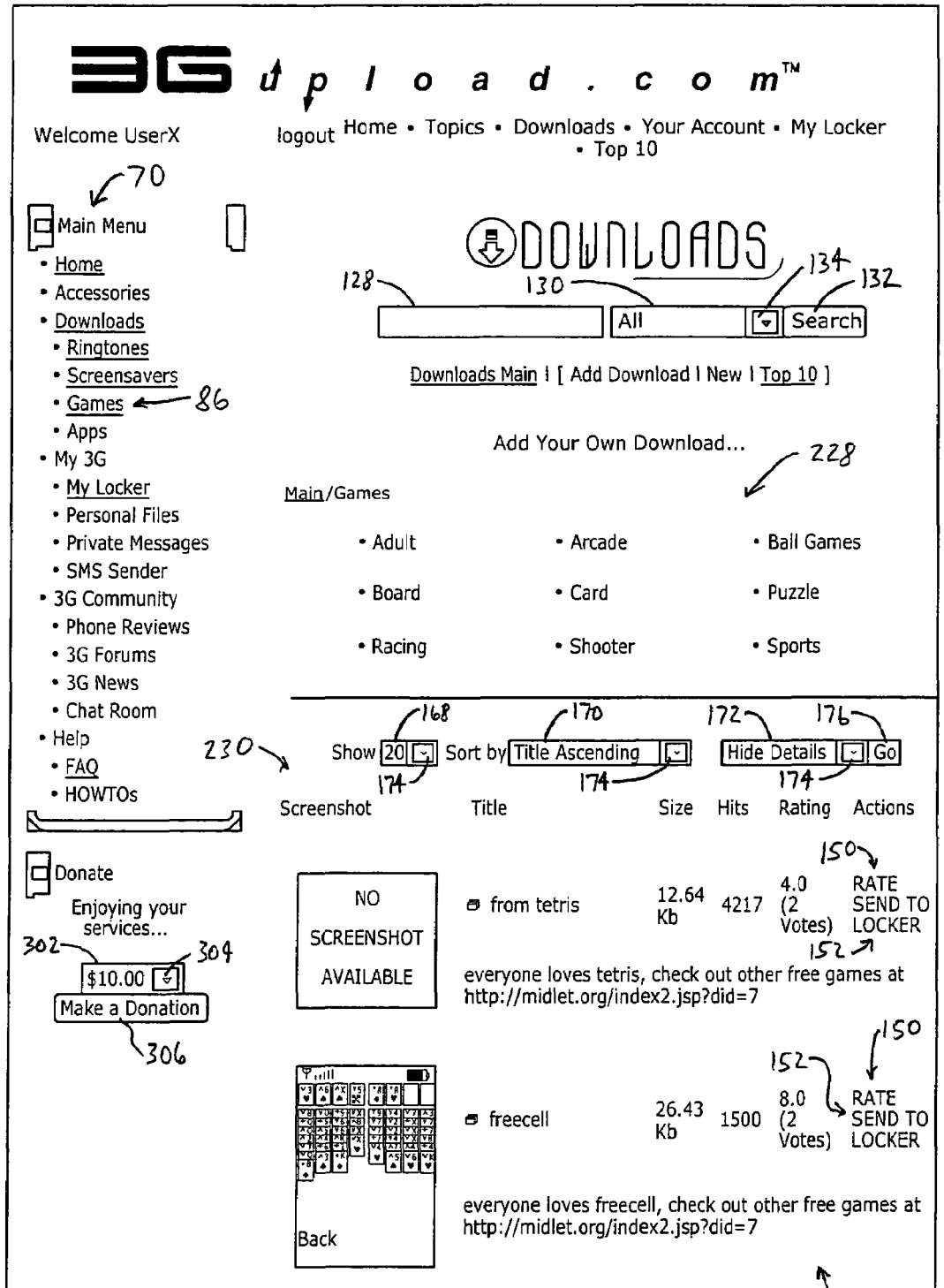
FIG. 10 is a screen shot of a Games Menu page of the website showing subcategories of data files from the main library that are selectable for placement in an associated user's locker for possible downloading as a game to an associated mobile phone of the user.

Assuming the user has logged in to the website established by server 32, if the user selects Games icon 86, system 30 responds with a Games Menu page 226 as shown, for example, in FIG. 10. Page 226 lists a menu 228 of icons corresponding to subcategories of available games data files 36 (sometimes referred to herein as "game files 36"), each subcategory of game data files 36 in menu 228 corresponding to a particular type of game or game topic. In the illustrative example, the subcategories for game data files 36 include the following: Adult, Arcade, Ball Games, Board, Card, Puzzle, Racing, Shooter, and Sports. This illustrative list of game subcategories associated with page 226 is not intended to be exhaustive, but rather to indicate that categories of game files 36 may be subcategorized into a wide variety and/or large number of groups.

In the illustrative embodiment, page 226 includes a table 230 of game files 36 appearing beneath menu 228 as shown in FIG. 10. System 30 may be programmed so that the game files 36 included in table 230 default to a particular subcategory of game files 36 or default to some other set of game files 36 based on criteria other than the subcategory lists. For example, system 30 may be programmed so that the 10 game files 36 most recently added to library 34 are shown in table 230. Regardless of the criteria used by system 30 to determine which game files 36 are listed in table 230, table 230 shows information about the game files 36 included therein. Each row in table 230 corresponds to a particular game file 36 of available data files 36. Table 230 is somewhat similar in format to table 146 described above, except for the following: (i) the Artist column of table 146 is replaced in table 230 by a Screenshot column and (ii) there is no Play or Preview icon 148 in the Actions column of table 230. The other columns of table 230 are the same as the columns in table 146 (other than the Artist column, as just mentioned) and are labeled, from left to right, Title, Size, Hits, Rating, and Actions.

The Screenshot column shows an exemplary image, if available, of the game listed in the associated Title column as shown in FIG. 10. The Size column lists, in kilobytes, the size of the associated data file 36. The Hits column lists the number of times the particular data file 36 has been selected by users for placement in their lockers 42. The Rating column lists the average rating (on a scale of 1 to 10) of the ringtone by users who have taken the steps to rate the ringtone. The Actions column of table 230 has a Rate icon 150 and a "Send to Locker" icon 150. Selection by a user of icons 150, 152 of table 230 causes system 30 to respond in the same manner as described above in connection with the manner that system 30 responds when icons 150, 152 of table 146 are selected by a user. Thus, the description above of the functions of system 30 associated with icons 150, 152 of table 146 is applicable to table 230 and is not repeated again.

A comment about each of the game files 36 listed in table 230 is included just beneath the Title, Size, Hits, Ratings, and Actions information of the associated game file 36 and just above the Title, Size, Hits, Ratings, and Actions information of the subsequent game file 36 as shown in FIG. 10. In addition, if more game files 36 are included in table 230 for a particular subcategory of games than can be seen on the screen of the user's computer 40, then system 30 will provide a scroll bar adjacent to table 230 to permit the user to scroll up or down to view the other files of table 230.

Figure 11:
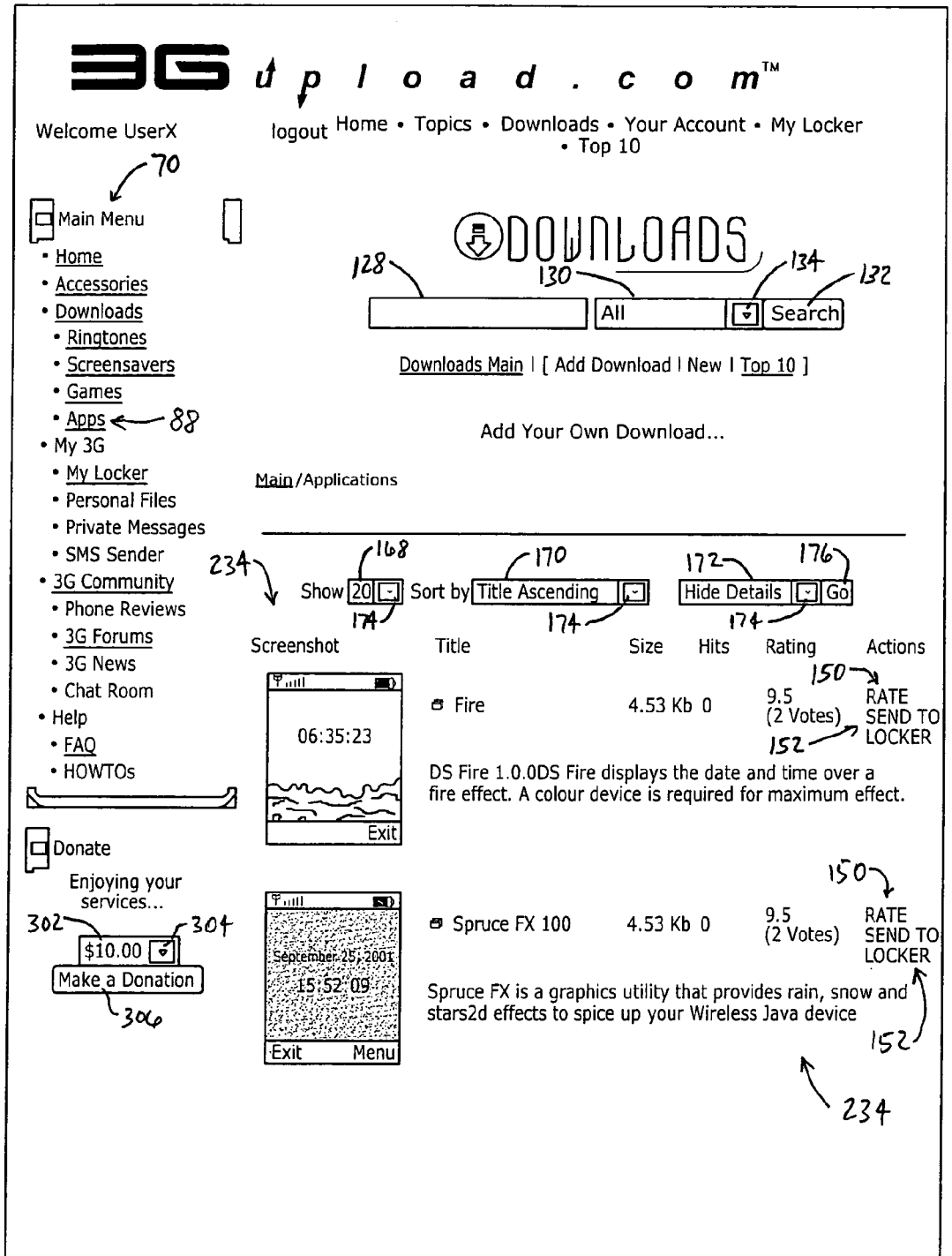
FIG. 11 is a screen shot of an Applications page of the website showing data files from the main library that are selectable for placement in an associated user's locker for possible downloading as an application to an associated mobile phone of the user.

Assuming the user has logged in to the website established by server 32, if the user selects Applications icon 88, system 30 responds with an Applications page 232 as shown, for example, in FIG. 11. Page 232 has a table 234 of application data files 36 (sometimes referred to herein as "applications files 36") that are selectable for placement in an associated user's locker 42 for possible downloading as an application to an associated mobile phone 44 of the user. Unlike ringtone files 36, screensaver files 36, and game files 36, which function on the user's phone 44 in the manner that their name implies as ringtones, screensavers, and games, respectively, application files 36 include a wide variety of files, which for the most part include software code that, when executed on a user's phone 44, perform an associated function. Examples of applications files 36 include animated screensaver software (i.e., screensaver's with moving fire, rain, snow, stars, and other 2D effects), language translation software (English to Spanish, Spanish to English, French to English, English to French, and so on), currency conversion software, list creation software (i.e., for creating grocery lists, task lists, and the like), software to show data about the periodic table of elements, picture drawing software, software to use phone 44 as a remote control for a personal computer 40 audio player, web viewer software (i.e., software that allows user's enhanced web site viewing capability), text messaging/e-mail software, product price comparison software (i.e., software that links the user to a price comparison website), software to create a stop watch implemented on the user's phone 44, and software to send faxes from the user's phone 44. The examples of applications files 36 is not intended to be exhaustive, and therefore, essentially all types of software files that may be used by phones 44 of users to perform some function are considered to be application files 36 within the scope of this disclosure.

In the illustrative embodiment, no subcategories are provided for application files 36 and thus, all applications files 36 available from library 34 of system 30 are listed in table 234. A scroll bar (not shown) or, alternatively, numbered page icons (with associated Next page and Previous page icons) of the type described above in connection with other tables of files 36 appearing on other web pages, may be provided adjacent table 234 to permit the user to view the other application files 36 of table 234. In alternative embodiments, system 30 may be programmed so that the application files 36 are subcategorized and so that table 234 defaults to a particular subcategory of application files 36 or to some other criteria, such as the 10 application files 36 most recently added to library 34. Regardless of the criteria used by system 30 to determine which application files 36 are listed in table 234, table 234 shows information about the application files 36 included therein. Each row in table 234 corresponds to a particular application file 36 of available data files 36. Table 234 is formatted substantially the same as table 230 described above. Thus, the columns of table 234 labeled, from left to right, are Screenshot, Title, Size, Hits, Rating, and Actions.

The Screenshot column of table 234 shows an exemplary image, if available, of the application listed in the associated Title column as shown in FIG. 11. The Size, Hits, and Rating columns of table 234 have the same type of information that the corresponding columns of table 230 has. The Actions column of table 234 has a Rate icon 150 and a "Send to Locker" icon 150, as was the case with table 230. Selection by a user of icons 150, 152 of table 234 causes system 30 to respond in the same manner as described above in connection other tables and is not repeated again. A comment about each of the application files 36 listed in table 234 is included for each data file 36 in table 234, as was the case for each data file in table 230.

Figure 12:
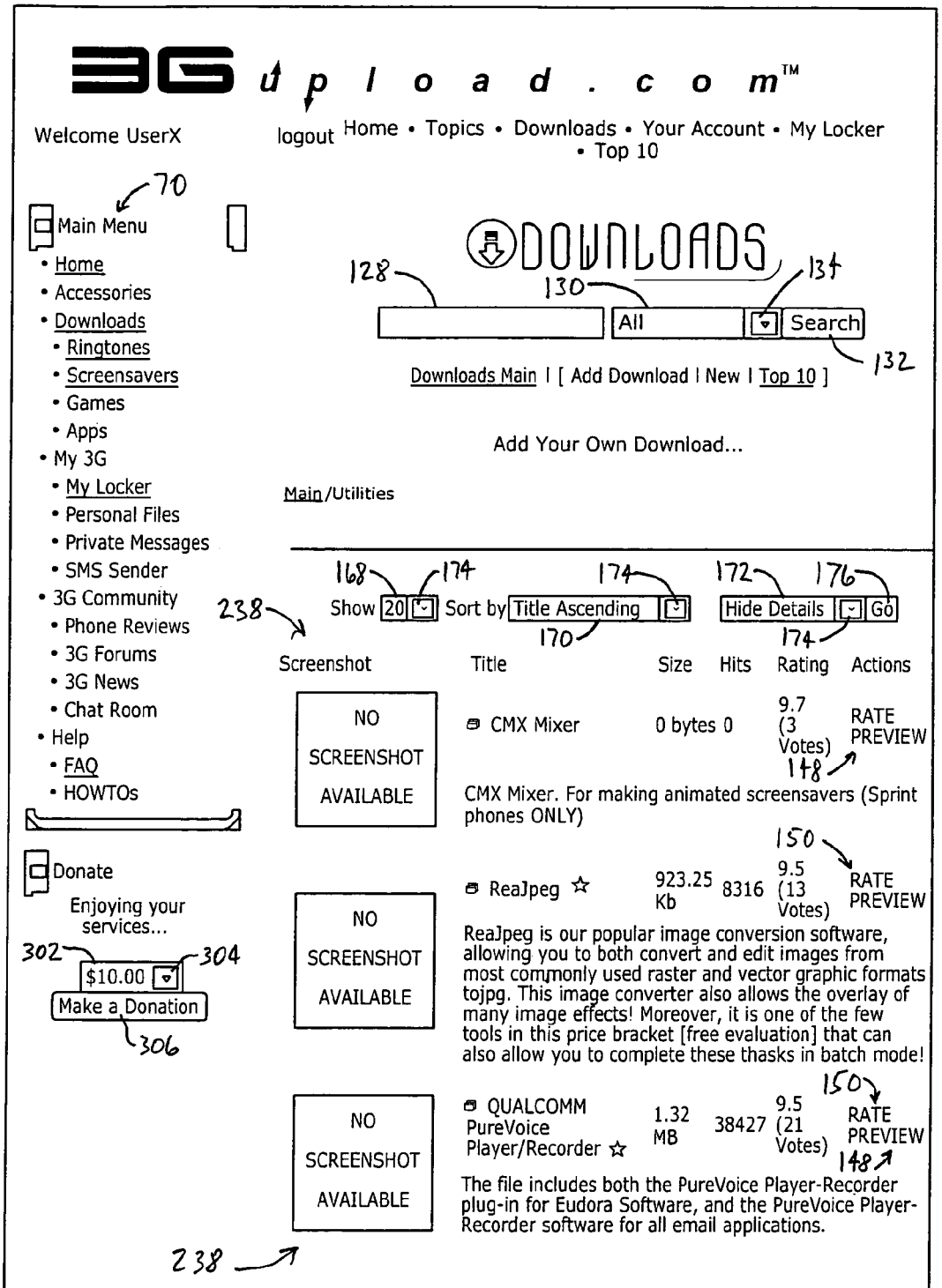
FIG. 12 is a screen shot of a Utilities page of the website showing data files from the main library that are available for possible downloading as a utility to an associated general purpose computer of the user.

Assuming the user has logged in to the website established by server 32 and is viewing page 124 of FIG. 3, if the user selects Utilities icon 126, system 30 responds with a Utilities page 236 as shown, for example, in FIG. 12. Page 236 has a table 238 of utility data files 36 (sometimes referred to herein as "utility files 36") that are selectable for downloading to the user's computer 40 for use as a utility on the user's computer 40. As was the case with application files 36, utility files 36 include a wide variety of files, which for the most part include software that, when executed on a user's computer 40, perform an associated function. Examples of utility files 36 include voice player recorder software (i.e., software that allows user's to create voice files on their computers 40), music edit software (i.e., software that allows user's to modify music files, such as midi files, and/or convert music files from one format, such as MP3, to another format, such as wav or midi, for example), phone connection software (i.e., software that allows users to interconnect their mobile phones 44 with their computer's 40, assuming the user has the appropriate connection cables and/or connection hardware), software that allows users to make their own animated screensaver files with their computers 40, and software to convert image files of non-jpg format to image files of jpg format. In many instances, the utility files 36 available from library 34 for users to download to their computers 40 are used by the users to create files (or convert files into the proper format) for uploading to system 30 and/or for eventual downloading to their mobile phones 44. The examples of utility files 36 is not intended to be exhaustive, and therefore, essentially all types of utility files that may be used by users to perform some function with their computers 40 are considered to be utility files 36 within the scope of this disclosure.

In the illustrative embodiment, no subcategories are provided for utility files 36 and thus, all utility files 36 available from library 34 of system 30 are listed in table 238. A scroll bar (not shown) or, alternatively, numbered page icons (with associated Next page and Previous page icons) of the type described above in connection with other tables of files 36 appearing on other web pages, may be provided adjacent table 238 to permit the user to view the other utility files 36 of table 238. In alternative embodiments, system 30 may be programmed so that the utility files 36 are subcategorized and so that table 238 defaults to a particular subcategory of utility files 36 or to some other criteria, such as the 10 utility files 36 most recently added to library 34. Regardless of the criteria used by system 30 to determine which utility files 36 are listed in table 238, table 238 shows information about the utility files 36 included therein. Each row in table 238 corresponds to a particular utility file 36 of available data files 36. Table 238 is formatted substantially the same as tables 230, 234 described above. Thus, the columns of table 238 labeled, from left to right, are Screenshot, Title, Size, Hits, Rating, and Actions. A comment about each of the utility files 36 listed in table 238 is included for each data file 36 in table 238, as was the case for each data file in tables 230, 234.

The Screenshot column of table 238 shows an exemplary image, if available, of the utility listed in the associated Title column. In the illustrative example of FIG. 11, no exemplary images are available for the utility files 36 titled CMX Mixer, RealJpeg, and QUALCOMM PureVoice Player/Recorder. The Size, Hits, and Rating columns of table 238 have the same type of information that the corresponding columns of tables 230, 234 have. The Actions column of table 234 has a Preview icon 148 (or in alternative embodiments, a "Download" icon 148) and a Rate icon 150. Thus, because utility files 36 are meant to be downloaded from system 30 to a user's computer 40, there is no "Send to Locker" icon 150 in table 238. Selection by a user of icon 150 of table 238 causes system 30 to respond in the same manner as described above in connection other tables and is not repeated again. Selection by a user of icon 148 in connection with table 238 causes system 30 to load the utility file 36 onto the user's computer 40 so that the user can use utility. In some instances, the user may need to enter with their computer's various information and/or respond to various commands and/or answer various questions in fields appearing on their computer 40 in order for the process of loading an associated utility file 36 onto the user's computer to be completed. After the utility file 36 is downloaded to the user's computer 40, the user may use the software of the utility file 36 with their computer 40 to perform the associated function.

As mentioned above, each user has their own data locker 42 in which data files 36 are stored. As also mentioned above, each time a user selects the "Send to Locker" icon 152 appearing on various tables of data files on various web pages, the associated data file 36 is copied by system 30 into the user's designated locker 42. If the user selects the "My Locker" icon 92, system 30 responds with a first Locker page 240 of the website as shown, for example, in FIG. 13. Page 240 has a table 242 showing a list of all of the data files 36 that have been stored by system 30 in the associated user's locker 42 in response to commands entered by the user on their computer 40.

Table 242 has columns labeled, from left to right, Delete, Type, "Name on Phone", Filename, Size, and "Date Added." Each row in table 242 corresponds to a particular data file 36 in the user's locker 42. Thus, in the illustrative example of FIG. 13, the user has three data files 36 in their locker 42. The Delete column contains, for each data file 36, a check box 244 that may be selected by a user to indicate that the user wants the associated data file 36 to be deleted from their locker by system 30 in response to the user subsequently selecting a "Delete Checked Items" button 246 which appears on page 240 beneath table 242. The Type column has, for each data file 36, a graphical image 248 indicative of the type of data file 36 (i.e., ringtone, screensaver, or "apps and games"). The graphical image 248 looks different for the different types of data files 36, although, in the illustrative example, the same graphical image is used to indicate a game file 36 and an application file 36. Specifically, in the illustrative embodiment, graphical images 248 indicate that the first data file 36 in table 242 is a screensaver file 36, the second data file 36 in table 242 is a ringtone file 36, and the third data file 36 in table 242 is either a game file 36 or an application file 36.

The "Name on Phone" column of table 242 shows the alphanumeric text string that will appear on the user's mobile phone 44 to indicate the associated data file 36 when the user links to system 30 with their associated mobile phone 44. The Filename column shows the name (referred to in some of the tables described above as the "Title") of the associated data file 36. In the illustrative example, each of the text strings in the "Name on Phone" column is identical to the Filename of the associated data file 36. System 30 may change the "Name on Phone" text string such as, for example, by truncating it if the Filename is longer than a predetermined length. The Size column indicates, for each data file 36, the file size in kilobytes. The "Date Added" column indicates, for each data file 36, the date that the user added the associated data file 36 to their locker 42.

Figure 13:
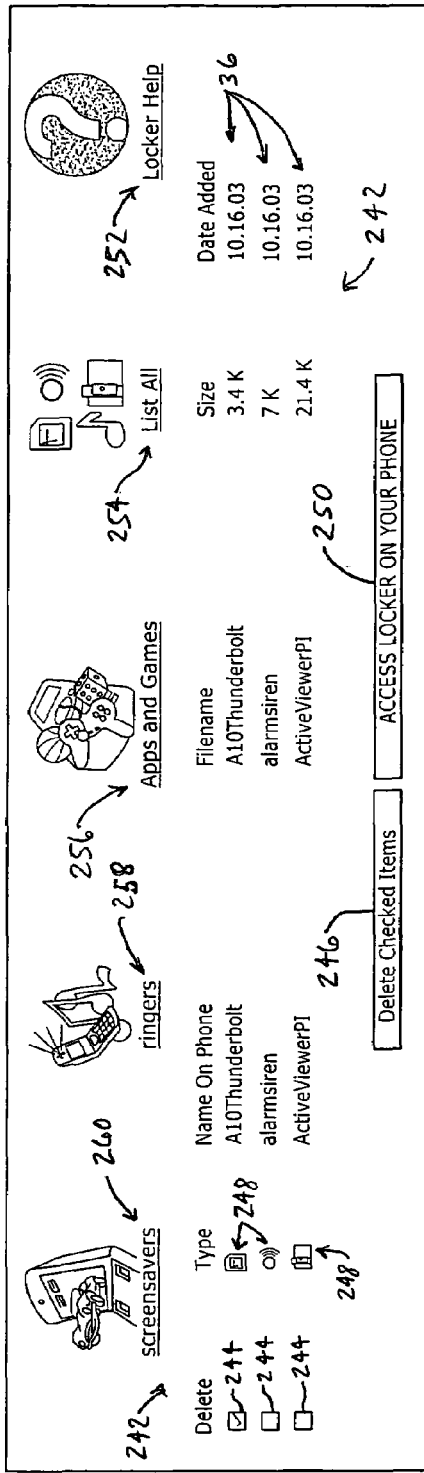
FIG. 13 is a screen shot of an example of a first Locker page of the website showing a list of data files that have been stored in an associated user's locker and showing a set of icons that are selectable by a user to view only a portion of the data files placed in their locker.
Figure 14:
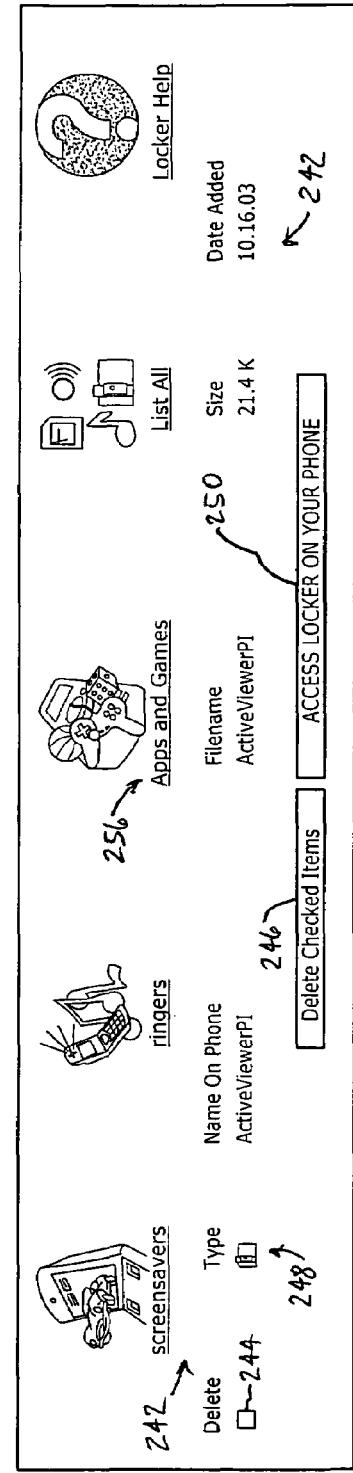
FIG. 14 is a screen shot of an example of a second Locker page of the website showing a list of game data files and/or application data files that have been stored in the user's locker.
Figure 15:
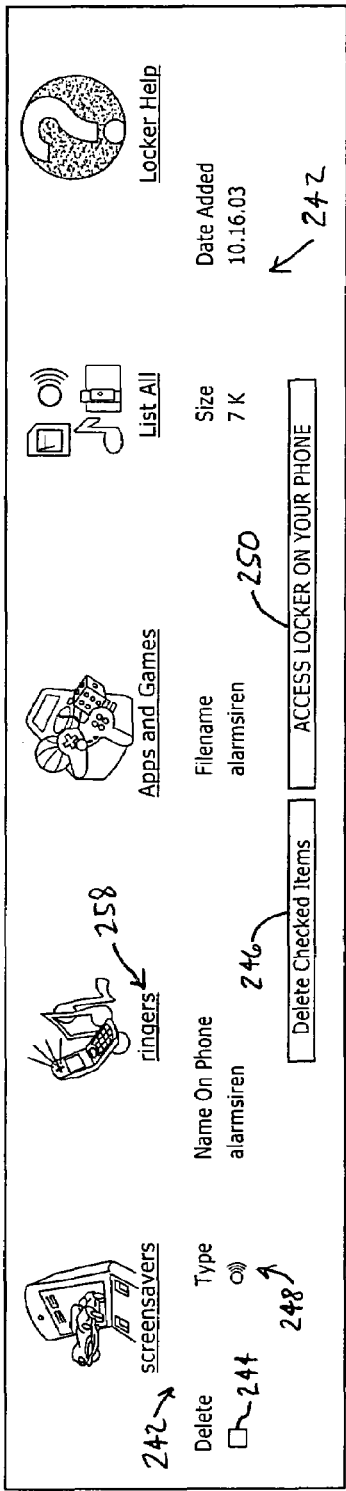
FIG. 15 is a screen shot of an example of a third Locker page of the website showing a list of ringtone data files that have been stored in the user's locker.

Page 240 also has an "Access Locker on Your Phone" button 250 beneath table 242 as shown in FIG. 13. If the user selects button 250, system 30 responds with an Informational web page (not shown) having information regarding the steps that user may take to download one or more data files 36 to their mobile phone. In one embodiment, the following information appears on the Informational web page in response to the user selecting button 250:

There are currently two methods for receiving files for your phone. A text message should arrive at your phone shortly so you can try method 1.

Method 1:
1. You receive a text message from 3GUpload.com
2. You can extract the URL from the text message and Go To on your phone.
3. This logs you into your locker, from there you can download your files.

Method 2:
1. Open your wap browser on your phone to this address: http://www.3gupload.com/wap/
2. Enter your login name and click the login button.
3. Click an item that you would like to download and it should ask you to download it to your phone.

Detailed instructions for downloading on Nokia Phones
1. Goto Menu
2. select services
3. goto mMode or whatever selection connects you to the internet on your phone
4. after it connects, hit the softkey under options
5. scroll down to goto adress, hit the softkey under select
6. use the number pad to type 3gupload.com/wap/ onto the existing http://
7. hit the softkey under OK
8. Once it loads up, scroll down until the username box is highlighted and hit the softkey under options
9. Scroll down and select edit
10. Type in your username using the number pad keys
11. hit the softkey under OK
12. Then hit the softkey under options
13. Scroll down to Login and select it
14. Now that you are in your locker, scroll down to a file you would like to download and click the softkey under options, then select open link
15. Now save the ringer.

Referring again to FIG. 13, page 240 further has a "Locker Help" icon 252, a "List All" icon 254, an "Apps and Games" icon 256, a Ringers icon 258, and a Screensavers icon 260. If the user selects "Locker Help" icon 252, system 30 responds with a web page (not shown) that provides users with links to answers to common questions and also contains a set of text blocks that permit a user to create a ticket to be sent to the system administrator with a message explaining a particular problem that the user is having with the website. Thus, in some embodiments, the web page associated with icon 252 is substantially the same as the web page associated with "Help" icon 108 discussed above.

If the user selects "List All" icon 254, system 30 responds by listing in table 242 all of the data files 36, regardless of file type, stored in the user's locker 42. If the user selects one of icons 256, 258, 260, then system 30 responds by listing in table 242 only those types of files implied by the names of icons 256, 258, 260. Thus, if the user selects "Apps and Games" icon 256, system 30 responds with a second Locker page 262, shown in FIG. 14, for example, in which only the application files 36 and game files 36 in the user's locker 42 are shown in table 242. Similarly, if the user selects Ringers icon 258, system 30 responds with a third Locker page 264, shown in FIG. 15, for example, in which only the ringtone files 36 in the user's locker 42 are shown in table 242. Furthermore, if the user selects Screensavers icon 260, system 30 responds with yet another Locker page (not shown) in which only the screensaver files 36 in the user's locker 42 are shown in table 242. When the user first opens their locker by selecting "My Locker" icon 92, system 30 defaults to listing all of the data files 36 in the user's locker 42 as mentioned above. Thus, a user would typically select icon 254 only after the user has first selected one of icons 256, 258, 260, so that the user could, once again, see in table 242 all of the data files 36 in the user's locker 42.

Figure 16:
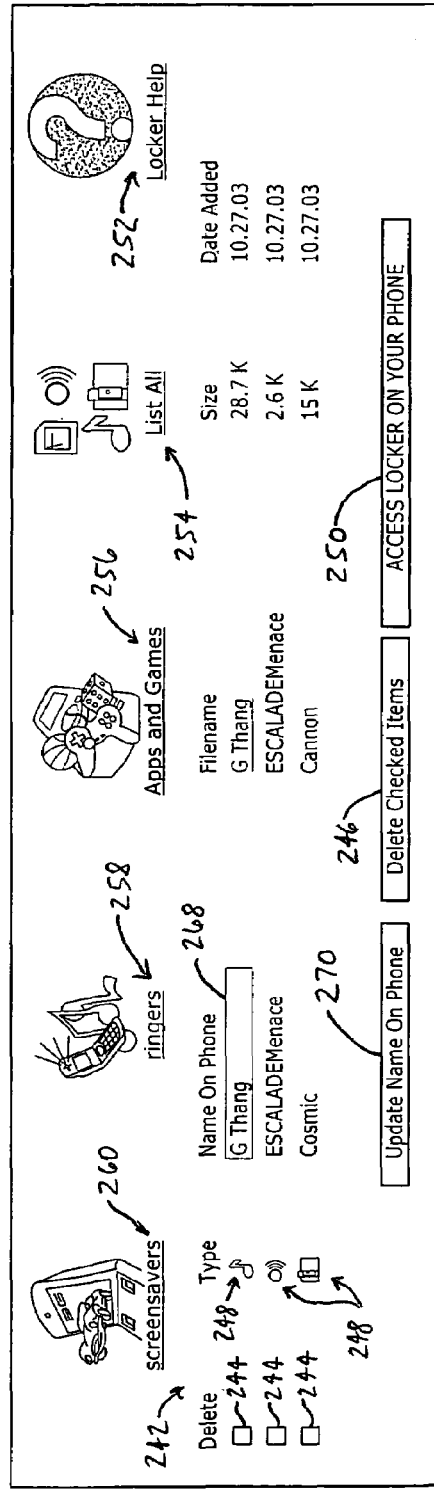
FIG. 16 is a screen shot of an alternative example of the first Locker page of the website showing a list of data files that have been stored in an associated user's locker and showing that the Name on Phone field is editable by the user to change the name of the data files that appear on the associated phone of the user after the associated data file is downloaded to the user's mobile phone.

An alternative first Locker page 266 is shown in FIG. 16 and is substantially similar to page 240 of FIG. 13 with a couple of exceptions. One difference between page 240 and page 266 is that text string for each data file 36 in the Name On Phone column of table 242 on page 266 is editable by the user as indicated by the edit box 268 shown in FIG. 16. Thus, the user may, if desired, change the name of the data files 36 that appear on the associated phone 44 of the user when the associated data file 36 is viewed with and/or downloaded to the user's mobile phone 44. In the illustrative example, the user may edit the text string "G Thang" by, for example, placing a cursor in box 268 and clicking a mouse (or hitting an enter key) to designate the text box 268 for editing. The user may then use the keyboard of their computer 40 to delete "G Thang" from box 268 and replacing it with a desired text string. If the user places the cursor over (or otherwise highlights) another of the text strings in the "Name On Phone" column, box 268 will appear around the associated text string to indicate that it may be edited. After the user has edited one or more of the text strings in the "Name On Phone" column, the user selects an "Update Name On Phone" button 270 to indicate to system 30 that the new text strings in the "Name On Phone" column are the text strings to be transmitted to the phone 44 of the user.

Whether system responds with page 240 or page 266 in response to a user selecting "My Locker" icon 92, is determined by system 30 based on the carrier that the associated user has for their mobile phone service. Some carriers permit users to have the filenames shown on the displays 50 of their phones 44 be different than the filename that is encoded or formatted into the file itself. Sprint PCS is an example of a carrier that permits this. Other carriers do not permit this. Thus, in the illustrative example, if Sprint PCS is the user's carrier, then system will respond with page 266 when the user selects icon 92 rather than page 240.

As mentioned above, system 30 establishes a personal file 54 for each user and each user may upload data files to their personal file 54. Thus, assuming the user has logged in to the website established by server 32, if the user selects "Personal Files" icon 94, system 30 responds with a first Personal Files page 272 as shown, for example, in FIG. 17. Page 272 has an "Upload File" box 274 and a Browse button 276. If the user selects button 276, a pop-up window (not shown) appears on the screen of the user's computer 40 with a directory of the files that are stored in the memory, including the hard drive, of the user's computer 40. The user then navigates through the directory, such as by clicking on a particular directory icon (e.g., a folder) to gain access to subdirectories (e.g., subfolders) in the directory or to gain access to individual files contained therein. After the user has navigated in the pop-up window to a data file that the user desires to upload to their personal file 54, the user selects the desired file, such as by double-clicking on the desired file or by any other method by which the desired file may be selected, and system 30 responds by adding the name of the desired file to Upload File box 274.

After the name of the data file that the user wants to upload to their personal file 54 is added to box 274, the user selects an "Upload File" button 278 appearing on page 272 and system 30 responds by copying the data file named in box 274 from the user's computer 40 to the user's personal file 54 in database 33 and also to the user's locker 42 in database 33. If the file to be uploaded to system 30 is an image file, then, as a result of the user selecting button 278, system 30 responds with a Size Selection web page (not shown, but similar to page 210 of FIG. 9) which permits the user to select between Proportional and Exact Fit options for the image. After the user selects either the Proportional or Exact Fit option, or, if the uploaded file is not an image file, after the user selects button 278, system 30 responds with a second Personal Files page 280 as shown, for example, in FIG. 18. On page 280, system 30 communicates a message 282 to the user indicating that the data file named in box 278 has been successfully added to the user's personal file 54 and has been copied to the user's locker 42 for possible downloading to the user's mobile phone 44. In the illustrative example, message 282 states "RGC.jpg has been added to your personal files collection and is now in your 3G locker." Thus, in the illustrative example, the user has added a data file named RGC.jpg to their personal file 54 and system 30 inserts the name of the uploaded file in message 282.

Page 280 also includes instructions for downloading data files from the user's locker 42 to their mobile phone 44. In the illustrative embodiment, the instructions are as follows:

A text message has just been sent to your phone:
1. view it
2. click MENU (not necessary on some phones)
3. choose GO, or if GO isn't and option, choose Menu→Extract URL
4. Once your locker loads up, select the category of your choice (ringers, screensavers, etc.)
5. Select an item you would like to download and click on it.

Select YES when the unsafe context box pops up

If you do not receive a text message, CLICK HERE for the manual process of visiting your locker.

If the user selects "CLICK HERE" in the instructions appearing on page 280, the user receives instructions regarding how to link "manually" to the website established by server 32 with their mobile phone 44 instead of linking via the URL link sent to their mobile phone 44 by system 30. The manual method of linking to the website of server 32 is discussed below in connection with FIGS. 25 and 26.

Figure 18:
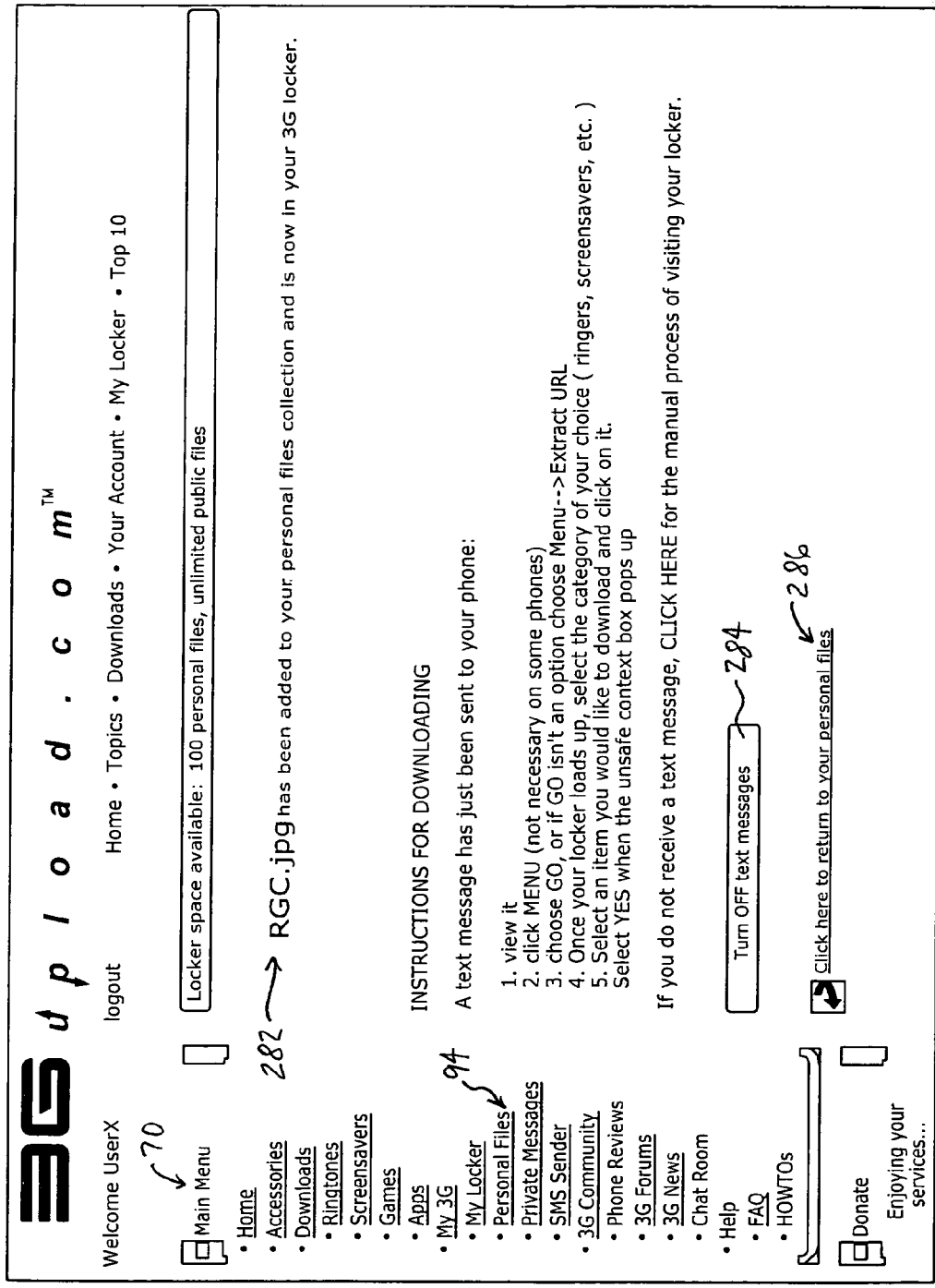
FIG. 18 is a screen shot of a second Personal Files page of the website showing a message to the user indicating that the selected file has been successfully added to their personal files and has been copied to the user's locker for possible downloading to their mobile phone.

Page 280 has a "Turn OFF text messages" button 284 as shown in FIG. 18. If the user selects button 284, system 30 will cease from sending any text messages to the user's phone 44 whenever a new data file from library 34 or from the user's personal file 54 is placed in the user's locker 42 during the user's current visit to the website. Thus, for example, if the user does not turn off the text messages, such as by selecting button 284, and the user places N number of data files in their locker 42 (N being an integer 1, 2, 3, 4, etc.), the user will receive N text messages from system 30 on their mobile phone 44. Page 284 further has a "Click here to return to your personal files" icon 286. If the user selects icon 286, system responds by returning the user to page 272.

After the user returns to page 272, by selecting icon 286 on page 280, the user will see a table 286 having information about the file that the user uploaded from their computer 40 to their personal file 54. Table 286 also shows information about any other files that the user has previously added to the user's personal file 54 of database 33. Each row of table 286, therefore, corresponds to a particular uploaded file in the user's personal file 54. The columns of table 286 are labeled, from left to right, Select, Preview, Filename, and Size. The Select column has a check box 288 for each file in table 286. The Preview column has an image, if available, of the uploaded file. Music files that users upload to be used as ringtones will not have an available image, for example. The Filename column lists the names of each of the files in the user's personal file 54. The Size column lists the file size, in kilobytes, of each of the files in the user's personal file 54.

Figure 17:
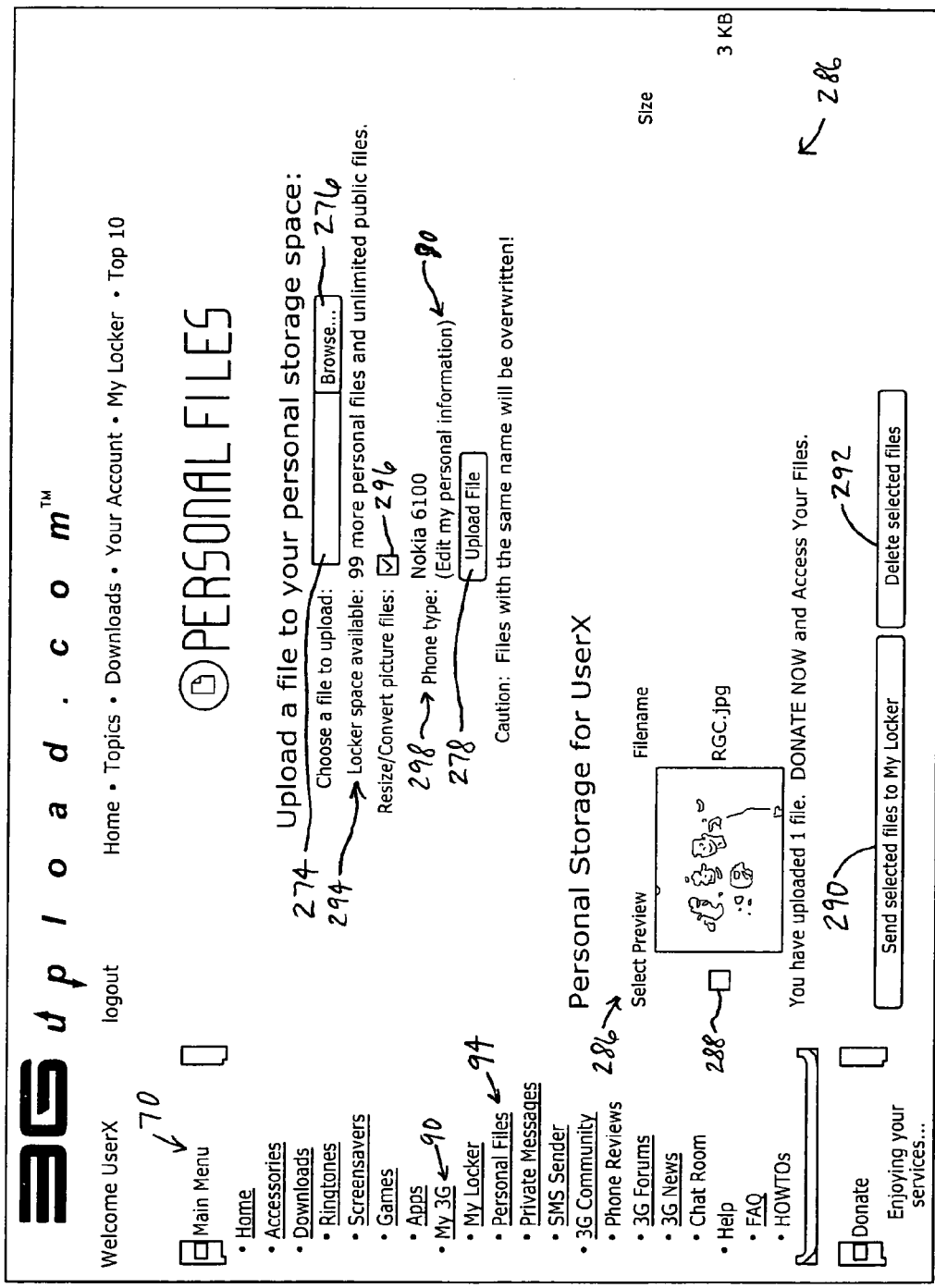
FIG. 17 is a screen shot of a first Personal Files page of the website showing a Browse button that may be used to select a file from the user's general purpose computer for uploading to their personal files on the website and an upload file button that, when selected, causes the selected file to be uploaded.

Page 272 has a "Send selected files to My Locker" button 290 and a "Delete selected files" button 292 as shown in FIG. 17. Before selecting either of buttons 290, 292, the user selects one or more files in table 286 by clicking on, or otherwise selecting, the associated check box 288 of the file(s) to be selected. After the user has selected the desired files listed in table 286 by checking the associated boxes 288, the user then may copy the selected files from the user's personal file 54 to the user's locker by selecting button 290 or, alternatively, the user may delete the selected files from the user's personal file 54 by selecting button 292. Because system 30 automatically copies to the user's locker 42 any files that are newly uploaded to the user's personal file 54, files in table 286 would typically only be selected by a user for sending to their locker 42 during subsequent visits to the website or after the user has deleted from their locker 42 the particular file selected in table 286.

Page 272 has a text line 294 that advises the user how much locker space is available in the user's locker. In the illustrative example, text line 294 states, "Locker space available: 99 more personal files and unlimited public files." Page 272 further has a "Resize/Convert picture files" check box 296 that, in a default state, is automatically selected by system 30, but that may be de-selected by the user, if desired. If the user decides to de-select check box 296, system 30 responds with a pop-up window containing the following message:

Resize/Convert picture files: When this option is enabled, any picture files uploaded to the Private Files section will be optimized and converted to fit your cell phone's display screen. The picture should be in JPG, PNG, BMP, or GIF format. Note that animated GIF files will appear as static, non-animated images on your phone unless they are first converted to PMD format. Only disable this option if you want to preserve the original size and format of your picture.

Page 272 also has a text line 298 which indicates the user's phone type and an "Edit my personal information" icon 90, which is redundant to the "My 3G" icon 90 discussed above and so the same reference number is used to denote both.

Various web pages of the website established by server 32, such as illustrative pages 124, 154, 140, 178, 226, 232, 234 shown in FIGS. 3, 4, 5, 7, 10, 11, 12, respectively, have a Donation Quantity box 302, a drop down arrow icon 304, and a "Make a Donation" button 306. Before a user is permitted to place any data files 36 into their locker, the user must first "subscribe" to the website of system 30 by making at least one donation. This first "donation," in one embodiment, is ten dollars which is the default amount that appears in box 302. To pay the subscription fee, the user selects button 306 and system 30 responds with one or more Payment pages (not shown) in which the user enters credit card information in the appropriate fields and submits the credit card information to system 30 to pay for their subscription.

After the user has subscribed to the website, the user may make optional, additional donations if the user so chooses. Thus, users who frequently use system 30 and users who enjoy the services of system 30 may feel inclined to make additional payments or, as they are referred to on the website, "donations," to the business entity that created the website. If the user selects drop down arrow icon 304, system 30 responds with a Donation menu listing the amounts that the user may chose to donate. In one embodiment, the amounts listed in the Donation menu are $5.99, $7.99, $10, $15, and $20. However, it is within the scope of this disclosure for the initial subscription amount and the amounts listed in the Donation menu to be amounts other than those mentioned above.

Figures 19, 20:
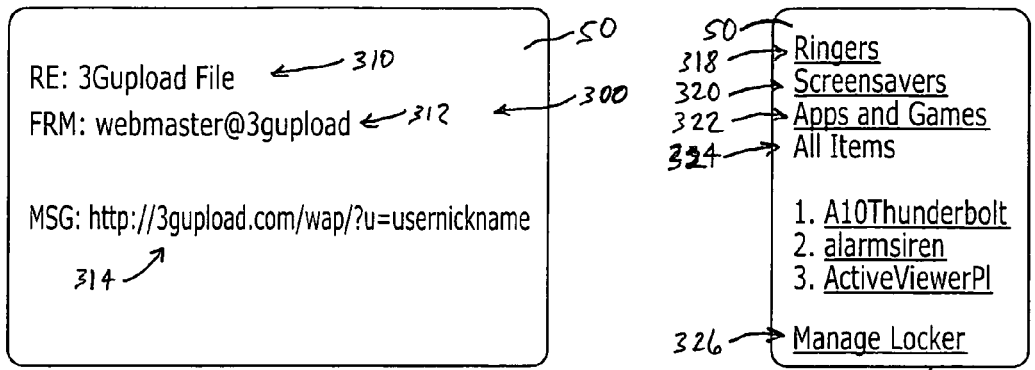
FIG. 19 is a screen shot of an example of a text message that is sent by the web server to an associated user's mobile phone with a URL link to the associated user's locker.
FIG. 20 is a screen shot of an example of a first Locker Menu page that appears on the associated user's mobile phone after linking to their locker using the URL link of FIG. 19, the first Locker Menu page listing all of the downloadable data files in the user's locker, and the first Locker Menu page having a list of hyper links that are selectable by the user to view on their mobile phone only a portion of the data files that are downloadable from the user's locker to their mobile phone.

As mentioned above several times, system 30 sends a text message to the mobile phones 44 of users with a URL link to the particular user's locker 42 associated with the website established by server 32. An example of a text message 300 that system 30 sends is shown in FIG. 19. Message 300 includes a RE line 310, a FRM line 312, and a MSG line 314. In the illustrative example, "3Gupload File" appears in RE line 310 to indicate what the message is regarding, "webmaster@3gupload" appears in FRM line 312 to indicate from whom the message was sent, and "http://3gupload.com/wap/?u=usernickname" appears in MSG line 314 to provide the URL link to the user's locker 42. As is apparent from the format of the URL link of line 314, the user's nickname (i.e., the user's I.D.) is included in the URL link to the user's locker 42. Thus, because no two users are permitted by system 30 to have the same user nickname, the URL link to each user's locker 42 is unique.

If the user selects the URL link in line 314, by appropriately manipulating the user interface 52 of the associated mobile phone 44 (which user interface 52 varies from model number to model number of mobile phone), a communication link is established between the mobile phone 44 and system 30 via network 39. Once the communication link is established, system 30 responds with a first Locker Menu page 316 that appears on the associated user's mobile phone 44 as shown, for example, in FIG. 20. Page 316 lists all of the downloadable data files 36 (including personal files) in the user's locker 42. In the illustrative embodiment, the files in the user's locker 42 are named "A10Thunderbolt," "alarmsiren," and "ActiveViewerPI." Page 316 also has a Ringers icon 318, a Screensavers icon 320, an "Apps and Games" icon 322, an "All Items" icon 324, and a "Manage Locker" icon 326.

By using the user interface 52 of mobile phone 44, such as by using "up" and "down" arrow keys, the user may highlight any of icons 318, 320, 322, 324, 326 or any of the filenames appearing on display 50. If there are more files 36 in the user's locker 42 than display 50 has room to show, then system 30 provides "Next Page" and "Previous Page" icons (not shown) on display 50 for the user to select to view the filenames of other data files 36 in the user's locker 42. In addition to, or in lieu of, the Next Page and Previous Page icons, system 30 may provide numbered page icons on display 50 for the user to select to view the filenames of other data files 36 in the user's locker. Once the user has highlighted on display 50 a desired filename of the data file 36 that the user wants to download to their mobile phone 44 from their locker 42, the user so indicates on user interface 52, such as by pressing an appropriate button or key, and system 30 responds by transmitting the selected data file 36 over network 39 to the user's phone 44. The data file 36 transmitted to phone 44 is stored in memory 48 of phone 44 as mentioned above.

Each of icons 318, 320, 322, 324 are selectable by the user to communicate to system 30 whether the user wants to see on their display 50 the filenames of all of the data files 36 in their locker 42 or only a subset of the data files in their locker 42. When the user initially links to the website established by server 32 with their mobile phone 44, system 30 defaults to responding with page 316 showing the filenames of all of the data files 36 in the user's locker. Thereafter, if the user selects Ringers icon 318, system 30 responds with a second Locker Menu page 328 on which is listed, along with icons 318, 320, 322, 324, 326, only the filenames of ringtone files 36 as shown, for example, in FIG. 21. In the illustrative example, the file named "alarmsiren" is the only ringtone file 36 in the user's locker 42 and therefore, is the only file 36 listed on page 328 after the user selects the Ringers icon 318.

Figures 21, 22, 23:
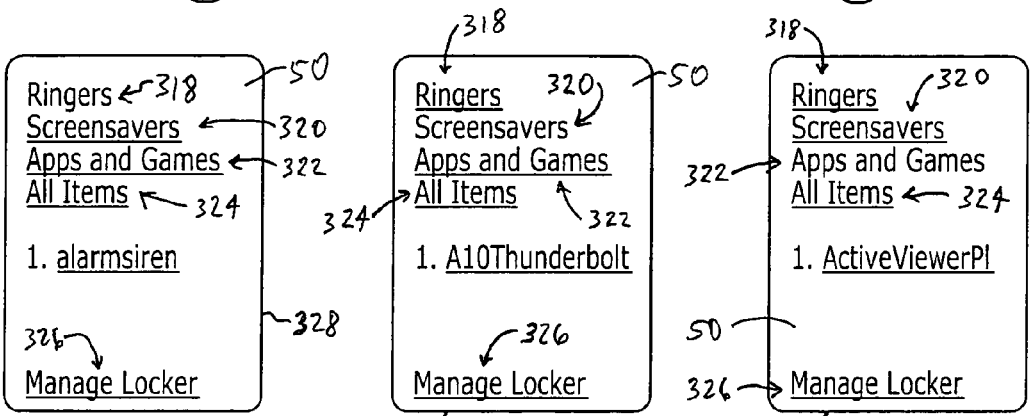
FIG. 21 is a screen shot of an example of a second Locker Menu page that appears on the associated user's mobile phone showing only the list of ringtone data files that are downloadable from the user's locker to their mobile phone.
FIG. 22 is a screen shot of an example of a third Locker Menu page that appears on the associated user's mobile phone showing only the list of screensaver data files that are downloadable from the user's locker to their mobile phone.
FIG. 23 is a screen shot of an example of a fourth Locker Menu page that appears on the associated user's mobile phone showing only the list of games and applications data files that are downloadable from the user's locker to their mobile phone.

If the user selects Screensavers icon 320, system 30 responds with a third Locker Menu page 330 on which is listed, along with icons 318, 320, 322, 324, 326, only the filenames of the screensaver files 36 as shown, for example, in FIG. 22. In the illustrative example, the file named "A10Thunderbolt" is the only screensaver file 36 in the user's locker 42 and therefore, is the only file 36 listed on page 330 after the user selects the Screensavers icon 320. Similarly, if the user selects "Apps and Games" icon 322, system 30 responds with a fourth Locker Menu page 332 on which is listed, along with icons 318, 320, 322, 324, 326, only the filenames of the application files 36 and the game files 36 as shown, for example, in FIG. 23. In the illustrative example, the file named "ActiveViewerPI" is the only application file 36 or game file 36 in the user's locker 42 and therefore, is the only file 36 listed on page 332 after the user selects the "Apps and Games" icon 320. Of course, if the user selects "All Items" icon 324, system 30 responds with page 316. Thus, by selecting one of icons 318, 320, 322, the user reduces the number of filenames through which the user has to scroll on their phone 44 to find the filename of a desired file 36 for downloading to their phone 44.

Figures 24, 25, 26:
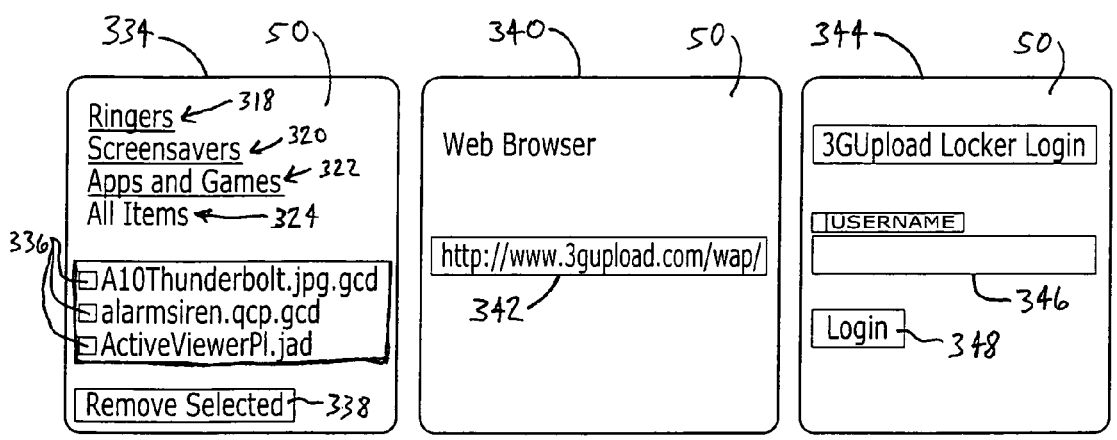
FIG. 24 is a screen shot of a Manage Locker page that appears on the associated user's mobile phone when Manage Locker hyperlink is selected on any of the pages of FIGS. 20–23, the Manage Locker page having check boxes next to each item in the user's locker and a Remove Selected button that is selectable to cause the checked items to be deleted from the user's locker.
FIG. 25 is a screen shot of an example of a Web Browser page of an associated user's mobile phone showing an address box in which the user may enter the web address of the website to link to the website.
FIG. 26 is a screen shot of a Locker Login page that appears on the associated user's mobile phone after linking to the website and the Locker Login page has a User Name box in which the user enters their user name to access their locker.

If the user selects "Manage Locker" icon 326, system 30 responds with a Manage Locker page 334 that appears on display 50 of the user's mobile phone 44 as shown, for example, in FIG. 24. Page 334 has a check box 336 next to each filename appearing on display 50. The user may highlight and select the filenames to be deleted from the user's locker 42 by appropriately manipulating the user interface 52 of the associated phone. After the user has selected the check boxes 336 of one or more filenames of the data files 36 to be deleted from the user's locker 42, the user highlights and selects a "Remove Selected" button 338 appearing on display 50 which signals system 30 to delete the selected data files 36 from the user's locker 42.

As previously mentioned, users may link "manually" to the website established by server 32. That is, users may link to the website without selecting a URL link included in a text message sent to the user's phone 44 by system 30. To do this, users must first go to a "Web Browser" page 340, shown, for example, in FIG. 25, of their phone 44 by selecting appropriate menu options that appear on the display 50 of the user's phone 44. The menu options that need to be selected to reach Web Browser page 340 are dictated by the manner in which the particular phone 44 is programmed and configured by the manufacturer. After page 340 appears on the display 50 of the user's phone 44, the user keys or types into a Web Address box 342 of page 340 the appropriate web address of the website established by server 32. In the illustrative example, the web address is http://www.3gupload.com/wap/.

After the appropriate web address is entered into web address box 342, the user presses an appropriate key or otherwise manipulates user interface 52 of the user's phone 44 to initiate connection to the website established by server 32. After successful connection to system 30 from phone 44 as a result of the user entering the appropriate web address in box 342 and initiating connection, system 30 responds with a "Locker Login" page 344 as shown, for example, in FIG. 26. Page 344 has a "User Name" box 346 and a Login button 348. To connect to locker 42, the user enters their user name in box 346 and selects button 348. After the user enters the appropriate user name in box 346 and selects button 348, system 30 responds with page 316 at which point the user may proceed in the manner described above in connection with FIGS. 20–24 to download files 36 to phone 44 or to delete files 36 from locker 42.

In some embodiments, system 30 will, from time to time, evaluate the data files stored in lockers 42 and personal files 54 of users to determine whether any of the stored files have error conditions that would prevent the files from being downloaded to the phones 44 of users. Optionally, system 30 may, from time to time, also evaluate the files 36 in library 34 to determine whether any of files 36 have error conditions. If system 30 detects a data file having an error condition (e.g., improper formatting, corruption, incompatible with a user's type of phone, etc.), system 30 either corrects the error, if system 30 is able to do so, or deletes the file having the error condition from database 33.

Although certain illustrative embodiments have been described in detail above, variations and modifications exist within the scope and spirit of this disclosure as described and as defined in the following claims.

The invention claimed is:

1. A method of providing user-selected data files to mobile phones of users, the method comprising:
   establishing a website that is accessible to each user via a general purpose computer,
   associating with the website a database having a main library of data files stored therein,
   establishing for each user, a user-specific data locker into which one or more user-selected data files selected by the associated user are copied from the main library of data files,
   copying the one or more user-selected data files from the main library of data files into the user-specific data locker of the associated user in response to receiving commands from an associated user via the user's general purpose computer regarding which of the data files from the main library of data files are to be listed in the user's user-specific data locker as the one or more user-selected data files,
   sending a text message to the mobile phone of the associated user, the text message having a URL link to the user-specific data locker of the associated user, and
   transmitting to the mobile phone of the associated user for storage in memory of the mobile phone at least one of the user-selected data files listed in the user-specific data locker of the associated user in response to commands received from the associated user via the user's mobile phone after the associated user accesses their user-specific data locker via the URL link sent to their mobile phone.

2. The method of claim 1, further comprising receiving from each user via their general purpose computer information about the associated user's type of mobile phone.

3. The method of claim 2, further comprising formatting the one or more user-selected data files based on the information about the associated user's type of mobile phone, so that the one or more user-selected data files are compatible with the associated user's type of mobile phone.

4. The method of claim 3, wherein formatting the one or more user-selected data files comprises modifying each data file by adding to a core data portion of the respective data file a header portion having information regarding at least one of a file name, a file size, a file type, and a file URL.

5. The method of claim 3, wherein formatting the one or more user-selected data files occurs in response to the associated user selecting the user-selected data file from the main library of data files for listing in the associated user's user-specific data locker.

6. The method of claim 3, wherein formatting the one or more user-selected data files occurs prior to the associated user selecting the user-selected data file from the main library of data files for listing in the associated user's user-specific data locker and occurs in response to a prior user selecting the same user-selected data file for listing in the prior user's user-specific data locker.

7. The method of claim 3, further comprising storing each formatted data file for use by the system in response to subsequent users having the same type of mobile phone for which the associated formatted data file was formatted in response to a prior user selecting the associated user-selected data file from the main library of data files.

8. The method of claim 1, further comprising dividing the main library of data files into a set of main categories that are selectable by each user browsing the website.

9. The method of claim 8, wherein the set of main categories comprises at least one of screensavers, ringtones, games, utilities, and applications.

10. The method of claim 8, further comprising further dividing the data files into sets of subcategories that are selectable by each user browsing the website, each set of subcategories being associated with an associated one of the main categories.

11. The method of claim 10, wherein the data files comprise ringtone files and at least some of the subcategories have associated therewith groups of ringtone files that are characterized by being from a similar genre of music.

12. The method of claim 10, wherein the data files comprise image files and at least some of the subcategories have associated therewith groups of image files that are characterized by being related to a similar topic.

13. The method of claim 10, wherein the data files comprise game software files and at least some of the subcategories have associated therewith groups of game software files that are characterized by being similar types of games.

14. The method of claim 1, wherein the data files comprise image files and further comprising giving the users the option of designating each user-selected image file as a proportional image file or an exact fit image file prior to copying the user-selected image file to the user's user-specific data locker.

15. The method of claim 1, wherein establishing the website comprises establishing one or more web pages that are configured to permit users to delete from their user-specific data locker selected ones of the user-selected data files in response to delete commands received from the users via their general purpose computers.

16. The method of claim 1, wherein establishing the website comprises establishing one or more web pages that are configured to permit users to delete from their user-specific data locker selected ones of the user-selected data files in response to delete commands received from the associated user via their mobile phone.

17. The method of claim 1, wherein establishing the website comprises establishing one or more locker web pages that are configured to permit users to view information about the user-selected data files that are stored in their user-specific data lockers.

18. The method of claim 17, wherein the one or more locker web pages have at least one of icons and hyperlinks that are usable by each user to view only a portion of the user-selected data files stored in their user-specific data locker.

19. The method of claim 1, further comprising establishing for each user a user-specific personal file that is separate from each associated user's user-specific data locker.

20. The method of claim 19, further comprising receiving from at least one user an uploaded data file that the at least one user uploads from their general purpose computer for storage in their user-specific personal file.

21. The method of claim 20, further comprising listing automatically the uploaded data file from the user-specific personal file of the at least one user in the user-specific data locker of the at least one user in response to the at least one user uploading the uploaded data file to the user-specific personal file of the at least one user.

22. The method of claim 20, wherein establishing the website comprises establishing one or more web pages that are configured to permit the at least one user to list the uploaded data file from the user-specific personal file of the at least one user in the user-specific data locker of the at least one user.

23. The method of claim 20, wherein establishing the website comprises establishing one or more web pages that are configured to permit the at least one user to delete the uploaded data file from the user-specific personal file of the at least one user in response to delete commands received from the at least one user via the general purpose computer of the at least one user.

24. The method of claim 19, further comprising listing the uploaded data file from the user-specific personal file of the at least one user in the user-specific data locker of the at least one user and transmitting to the mobile phone of the at least one user the uploaded data file listed in the user-specific data locker of the at least one user in response to commands received from the at least one user via the mobile phone of the at least one user after the at least one user accesses their user-specific data locker via their mobile phone.

25. The method of claim 19, further comprising evaluating the uploaded data file and automatically deleting the uploaded data file if an error condition is detected.

26. The method of claim 1, further comprising evaluating the user-selected data files and automatically deleting the uploaded data file if an error condition is detected.

27. The method of claim 1, wherein establishing the website comprises establishing one or more web pages having at least one of icons and hyperlinks that are usable by each user to download user-provided data files from the general purpose computers of the users to the database for inclusion in the main library of data files which is accessible to all users.

28. The method of claim 27, further comprising screening each user-provided data file for system compatibility prior to including each user-provided data file in the main library of data files.

29. The method of claim 28, further comprising modifying at least one of the user-provided data files into a format that is system compatible in response to a determination during the screening that the at least one user-provided data file is not system compatible.

30. A system for providing user-selected data files to mobile phones of users, the system comprising
a server configured to establish a website that is accessible to the users via general purpose computers of the users,
a database that is associated with the website and that has a main library of data files stored therein, and
a plurality of user-specific data lockers, each user-specific data locker being designated to an associated one of the users for listing one or more user-selected data files selected by the associated user from the main library of data files, the server being configured to list the one or more user-selected data files from the main library of data files in the user-specific data locker of the associated user in response to commands received from the associated user via the user's general purpose computer regarding which of the data files from the main library of data files are to be designated as the one or more user-selected data files, the server being configured to send a text message to the mobile phone of the associated user, the text message having a URL link to the user-specific data locker of the associated user, the server being configured to initiate transmission to the mobile phone of the associated user for storage in memory of the mobile phone at least one of the user-selected data files listed in the user-specific data locker of the associated user in response to commands received from the associated user via the user's mobile phone after the associated user accesses their user-specific data locker via the URL link sent to their mobile phone.

31. The system of claim 30, wherein the server is configured to receive from each user via their general purpose computer information about the associated user's type of mobile phone.

32. The system of claim 31, wherein the server is configured to format the one or more user-selected data files based on the information about the associated user's type of mobile phone, so that the one or more user-selected data files are compatible with the associated user's type of mobile phone.

33. The system of claim 32, wherein the server is configured to format the one or more user-selected data files by modifying the one or more user-selected data files by adding to a core data portion of the respective data file a header portion having information regarding at least one of a file name, a file size, a file type, and a file URL.

34. The system of claim 32, wherein the server is configured to format the one or more user-selected data files in response to the associated user selecting the one or more user-selected data files from the main library of data files for listing in the associated user's user-specific data locker.

35. The system of claim 32, wherein the server is configured to store each formatted data file for use by the system in response to subsequent users having the same type of mobile phone for which the associated formatted data file was formatted in response to a prior user selecting the associated user-selected data file from the main library of data files.

36. The system of claim 30, wherein the main library of data files is divided into a set of main categories that are selectable by each user browsing the website.

37. The system of claim 36, wherein the set of main categories comprises at least one of screensavers, ringtones, games, utilities, and applications.

38. The system of claim 36, wherein the data files are further divided into sets of subcategories that are selectable by each user browsing the website, each set of subcategories being associated with an associated one of the main categories.

39. The system of claim 38, wherein the data files comprise ringtone files and at least some of the subcategories have associated therewith groups of ringtone files that are characterized by being from a similar genre of music.

40. The system of claim 38, wherein the data files comprise image files and at least some of the subcategories have associated therewith groups of image files that are characterized by being related to a similar topic.

41. The system of claim 38, wherein the data files comprise game software files and at least some of the subcategories have associated therewith groups of game software files that are characterized by being similar types of games.

42. The system of claim 30, wherein the data files comprise image files and the server is configured to give the users the option of designating each user-selected image file as a proportional image file or an exact fit image file prior to listing the user-selected image file in the user's user-specific data locker.

43. The system of claim 30, wherein the website comprises one or more web pages that are configured to permit users to communicate delete commands from their general purpose computers to the server and the delete commands result in selected ones of the user-selected data files being delisted from the user-specific data lockers.

44. The system of claim 30, wherein the website comprises one or more web pages that are configured to permit users to communicate delete commands from their mobile phones to the server and the delete commands result in selected ones of the user-selected data files being delisted from the user-specific data lockers.

45. The system of claim 30, wherein the website comprises one or more locker web pages that are configured to permit users to view information about the user-selected data files that are listed in their user-specific data lockers.

46. The system of claim 45, wherein the one or more locker web pages have at least one of icons and hyperlinks that are usable by each user to view only a portion of the user-selected data files listed in their user-specific data locker.

47. The system of claim 30, further comprising a plurality of user-specific personal files, each user-specific personal file being designated to an associated one of the users for storage of one or more uploaded data files that are uploaded from the general purpose computer of the associated user, and each user-specific personal file being separate from each associated user's user-specific data locker.

48. The system of claim 47, wherein the server is configured to list automatically the uploaded data files from the user-specific personal files of the associated users in the user-specific data lockers of the associated users in response to the uploading the uploaded data files to the user-specific personal files of the associated users.

49. The system of claim 47, wherein the website comprises one or more web pages that are configured to permit the users to list the uploaded data files from the user-specific personal files of the associated users in the user-specific data lockers of the associated users.

50. The system of claim 47, wherein the website comprises one or more web pages that are configured to permit the users to delist the uploaded data files from their user-specific personal files in response to delete commands received from the users via their general purpose computers.

51. The system of claim 47, wherein the server is configured to list automatically the uploaded data files from the user-specific personal files of the users in the user-specific data lockers of the associated users and to initiate transmission to the mobile phone of the uploaded data files from the user-specific data lockers of the associated users in response to commands received from the associated users via their mobile phones after the associated users access their user-specific data lockers via their mobile phones.

52. The system of claim 47, wherein the server is configured to evaluate the uploaded data file and automatically delete any uploaded data files for which an error condition is detected.

53. The system of claim 30, wherein the server is configured to evaluate the user-selected data files and automatically delete any uploaded data files for which an error condition is detected.

54. The system of claim 30, wherein the website comprises one or more web pages having at least one of icons and hyperlinks that are usable by each user to download user-provided data files from the general purpose computers of the users to the database for inclusion in the main library of data files which is accessible to all users.

55. A method of providing data files to mobile phones of users, the method comprising
establishing a website that is accessible to each user via a general purpose computer,
associating with the website a database having a main library of data files stored therein,
establishing, for each user, a user-specific data locker in which are listed one or more user-selected data files selected by the associated user from the main library of data files,
establishing, for each user, a user-specific personal file into which are stored one or more uploaded data files that are uploaded from the general purpose computer of the associated user,
listing the one or more uploaded data files from the user-specific personal file of the associated user in the user-specific data locker of the associated user,
listing the one or more user-selected data files from the main library of data files in the user-specific data locker of the associated user in response to commands received from the associated user via the user's general purpose computer regarding which of the data files from the main library of data files are to be designated as the one or more user-selected data files, and transmitting to the mobile phone of the associated user for storage in memory of the mobile phone at least one user-selected data file or at least one uploaded data file listed in the user-specific data locker of the associated user in response to commands received from the associated user via the user's mobile phone after the associated user accesses their user-specific data locker via their mobile phone.

56. The method of claim 55, further comprising sending a text message to the mobile phone of the associated user and the text message having a URL link that is used by the associated user to access their user-specific data locker via their mobile phone.

57. The method of claim 55, further comprising receiving from at least one user an uploaded data file that the at least one user uploads from their general purpose computer for storage in their user-specific personal file.

58. The method of claim 55, wherein listing the one or more uploaded data files in the user-specific data locker of the associated user occurs automatically in response to the associated user uploading the one or more uploaded data files to the user-specific personal file of the associated user.

59. The method of claim 55, wherein establishing the website comprises establishing one or more web pages that are configured to permit the users to list the uploaded data files from their user-specific personal files in their user-specific data lockers.

60. The method of claim 55, wherein establishing the website comprises establishing one or more web pages that are configured to permit the users to delist the uploaded data files from their user-specific personal files in response to delete commands received from the users via their general purpose computers.

61. The method of claim 55, further comprising evaluating the uploaded data files and automatically deleting any uploaded data file for which an error condition is detected.

62. A system for providing user-selected data files to mobile phones of users, the system comprising a server configured to establish a website that is accessible to the users via general purpose computers of the users, a database that is associated with the website and that has a main library of data files stored therein, a plurality of user-specific data lockers, each user-specific data locker being designated to an associated user for listing one or more user-selected data files selected by the associated user from the main library of data files, the server being configured to list the one or more user-selected data files from the main library of data files in the user-specific data locker of the associated user in response to commands received from the associated user via the user's general purpose computer regarding which of the data files from the main library of data files are to be designated as the one or more user-selected data files, and a plurality of user-specific personal files, each user-specific personal file being designated to an associated user for storage of one or more uploaded data files that are uploaded from the general purpose computer of the associated user, the server being configured to list the one or more uploaded data files from the user-specific personal file of the associated user in the user-specific data locker of the associated user, the server being configured to initiate transmission to the mobile phone of the associated user for storage in memory of the mobile phone at least one user-selected data file or at least one uploaded data file from the user-specific data locker of the associated user in response to commands received from the associated user via the user's mobile phone after the associated user accesses their user-specific data locker via their mobile phone.

63. The system of claim 62, wherein the server is configured to send a text message to the mobile phone of the associated user and the text message has a URL link that is used by the associated user to access their user-specific data locker via their mobile phone.

64. The system of claim 62, wherein the server is configured to list the one or more uploaded data files from the user-specific personal file of the associated user in the user-specific data locker of the associated user automatically in response to the associated user uploading the one or more uploaded data files to the user-specific personal file of the associated user.

65. The system of claim 62, wherein the website comprises one or more web pages that are configured to permit the users to list the uploaded data files from their user-specific personal files in their user-specific data lockers.

66. The system of claim 62, wherein the website comprises one or more web pages that are configured to permit the users to delist the uploaded data files from their user-specific personal files in response to delete commands received from the users via their general purpose computers.

67. The system of claim 62, wherein the sever is configured to evaluate the uploaded data files and automatically delete any uploaded data file for which an error condition is detected.

* * * * *